(12) United States Patent
Komeda et al.

(10) Patent No.: US 7,874,725 B2
(45) Date of Patent: Jan. 25, 2011

(54) OPTICAL FIBER TEMPERATURE DISTRIBUTION MEASURING APPARATUS, METHOD FOR MEASURING OPTICAL FIBER TEMPERATURE DISTRIBUTION, AND OPTICAL FIBER TEMPERATURE DISTRIBUTION MEASURING SYSTEM

(75) Inventors: Hidehiko Komeda, Tokyo (JP);
Tsuyoshi Igi, Tokyo (JP); Yasushi Koyano, Kanagawa (JP); Fumiyoshi Ohkubo, Kanagawa (JP); Kazuaki Negishi, Kanagawa (JP)

(73) Assignees: J-Power Systems Corporation, Tokyo (JP); Sumitomo Electric Industries, Ltd., Osaka (JP)

( * ) Notice: Subject to any disclaimer, the term of this patent is extended or adjusted under 35 U.S.C. 154(b) by 386 days.

(21) Appl. No.: 12/083,689

(22) PCT Filed: Sep. 21, 2007

(86) PCT No.: PCT/JP2007/068454

§ 371 (c)(1),
(2), (4) Date: Apr. 17, 2008

(87) PCT Pub. No.: WO2008/035784

PCT Pub. Date: Mar. 27, 2008

(65) Prior Publication Data
US 2009/0059996 A1 Mar. 5, 2009

(30) Foreign Application Priority Data
Sep. 22, 2006 (WO) .............. PCT/JP2006/318858

(51) Int. Cl.
*G01K 11/00* (2006.01)
*G01K 1/00* (2006.01)
*G01K 15/00* (2006.01)
*G01J 5/00* (2006.01)

(52) U.S. Cl. .............. 374/161; 374/137; 374/131; 374/120; 374/1

(58) Field of Classification Search ............ 374/161, 374/1, 120, 137, 131
See application file for complete search history.

(56) References Cited

U.S. PATENT DOCUMENTS
5,113,277 A 5/1992 Ozawa et al.
(Continued)

FOREIGN PATENT DOCUMENTS
GB 2140554 A * 11/1984
(Continued)

OTHER PUBLICATIONS
PCT/IB/308.
(Continued)

*Primary Examiner*—Lisa M Caputo
*Assistant Examiner*—Mirellys Jagan
(74) *Attorney, Agent, or Firm*—McGinn IP Law Group PLLC

(57) ABSTRACT

An optical fiber temperature distribution measuring apparatus and a method for measuring optical fiber temperature distribution, provided with a light source for inputting a pulse light to an optical fiber to be measured, a signal detecting unit for detecting a received light intensity of a predetermined light included in a backscattering light generated by an input of the pulse light in the optical fiber to be measured, and a signal processing unit for calculating a value corresponding to a variation of the received light intensity due to a hydrogen molecular absorption of the optical fiber to be measured based on the received light intensity of the predetermined light, to compensate the received light intensity of the predetermined light corresponding to a temperature of the optical fiber to be measured based on the value.

24 Claims, 23 Drawing Sheets

U.S. PATENT DOCUMENTS

2003/0219190 A1* 11/2003 Pruett .......................... 385/12
2007/0081773 A1* 4/2007 Pizzorno et al. ............. 385/100
2007/0223556 A1* 9/2007 Lee et al. ...................... 374/1
2008/0089636 A1* 4/2008 MacDougall et al. ......... 385/12

FOREIGN PATENT DOCUMENTS

JP              3063063        5/2000

OTHER PUBLICATIONS

Form PCT/IB/338 for PCT/JP2006/318858.
Form PCT/IB/326 for PCT/JP2006/318858.
Form PCT/IB/373 for PCT/JP2006/318858.
Form PCT/ISA/237 with English-language Translation for PCT/JP2006/318858.
Form PCT/IB/338 for PCT/JP2007/068454.
Form PCT/IB/326 for PCT/JP2007/068454.
Form PCT/IB/373 for PCT/JP2007/068454.
Form PCT/ISA/237 with English-language Translation for PCT/JP2007/068454.
Dakin, J.P., et al., "Electronic Letters", Optical Fibre Raman Temperature Sensor using a Semiconductor Light Source and Detector, Jun. 20, 1985, vol. 21, No. 13, p. 569-570.
N. Uchida, N. Uesugi, "Infrared Optical Loss Increase in Silica Fibers due to Hydrogen", J. Lightwave Technol., vol. LT-4, No. 8, pp. 1132-1138, Aug. 1986.
H. Kanamori et al., "Transmission Characteristics and Reliability of Pure-Silica-Core Single-Mode Fibers", J. Lightwave Technol., vol. LT-4, No. 8, pp. 1144-1150, Aug. 1986.
Canadian Office Action dated Aug. 26, 2010.

* cited by examiner

| OPTICAL TRANSMISSION LOSS AMOUNT (dB/km) | | | | | |
|---|---|---|---|---|---|
| HYDROGEN PARTIAL PRESSURE (MPa) / WAVELENGTH (nm) | 0.20 | 0.15 | 0.09 | 0.05 | 0 |
| 850 | 1.93 | 1.87 | 1.80 | 1.74 | 1.68 |
| 1240 | 8.46 | 6.38 | 4.38 | 2.42 | 0.36 |
| 1300 | 0.60 | 0.53 | 0.46 | 0.39 | 0.31 |
| 1450 | 0.34 | 0.30 | 0.27 | 0.24 | 0.21 |
| 1550 | 0.75 | 0.60 | 0.46 | 0.31 | 0.17 |
| 1650 | 3.70 | 2.86 | 1.98 | 1.10 | 0.22 |
| 1690 | 11.15 | 8.43 | 5.75 | 3.07 | 0.33 |

| OPTICAL TRANSMISSION LOSS INCREMENT (dB/km) | | | | |
|---|---|---|---|---|
| HYDROGEN PARTIAL PRESSURE (MPa) / WAVELENGTH (nm) | 0.20 | 0.15 | 0.09 | 0.05 |
| 850 | 0.25 | 0.19 | 0.12 | 0.06 |
| 1240 | 8.10 | 6.02 | 4.02 | 2.05 |
| 1300 | 0.29 | 0.22 | 0.14 | 0.07 |
| 1450 | 0.13 | 0.09 | 0.06 | 0.03 |
| 1550 | 0.58 | 0.43 | 0.29 | 0.14 |
| 1650 | 3.48 | 2.64 | 1.76 | 0.88 |
| 1690 | 10.82 | 8.11 | 5.42 | 2.74 |

| A PROPORTION OF OPTICAL TRANSMISSION LOSS INCREMENT (dB/km) (FOR 1550 nm) | | | | |
|---|---|---|---|---|
| HYDROGEN PARTIAL PRESSURE (MPa) / WAVELENGTH (nm) | 0.20 | 0.15 | 0.09 | 0.05 |
| 850 | 0.44 | 0.44 | 0.43 | 0.44 |
| 1240 | 14.04 | 13.97 | 13.93 | 14.33 |
| 1300 | 0.50 | 0.51 | 0.50 | 0.51 |
| 1450 | 0.22 | 0.22 | 0.22 | 0.22 |
| 1550 | 1.00 | 1.00 | 1.00 | 1.00 |
| 1650 | 6.04 | 6.13 | 6.09 | 6.18 |
| 1690 | 18.76 | 18.81 | 18.80 | 19.16 |

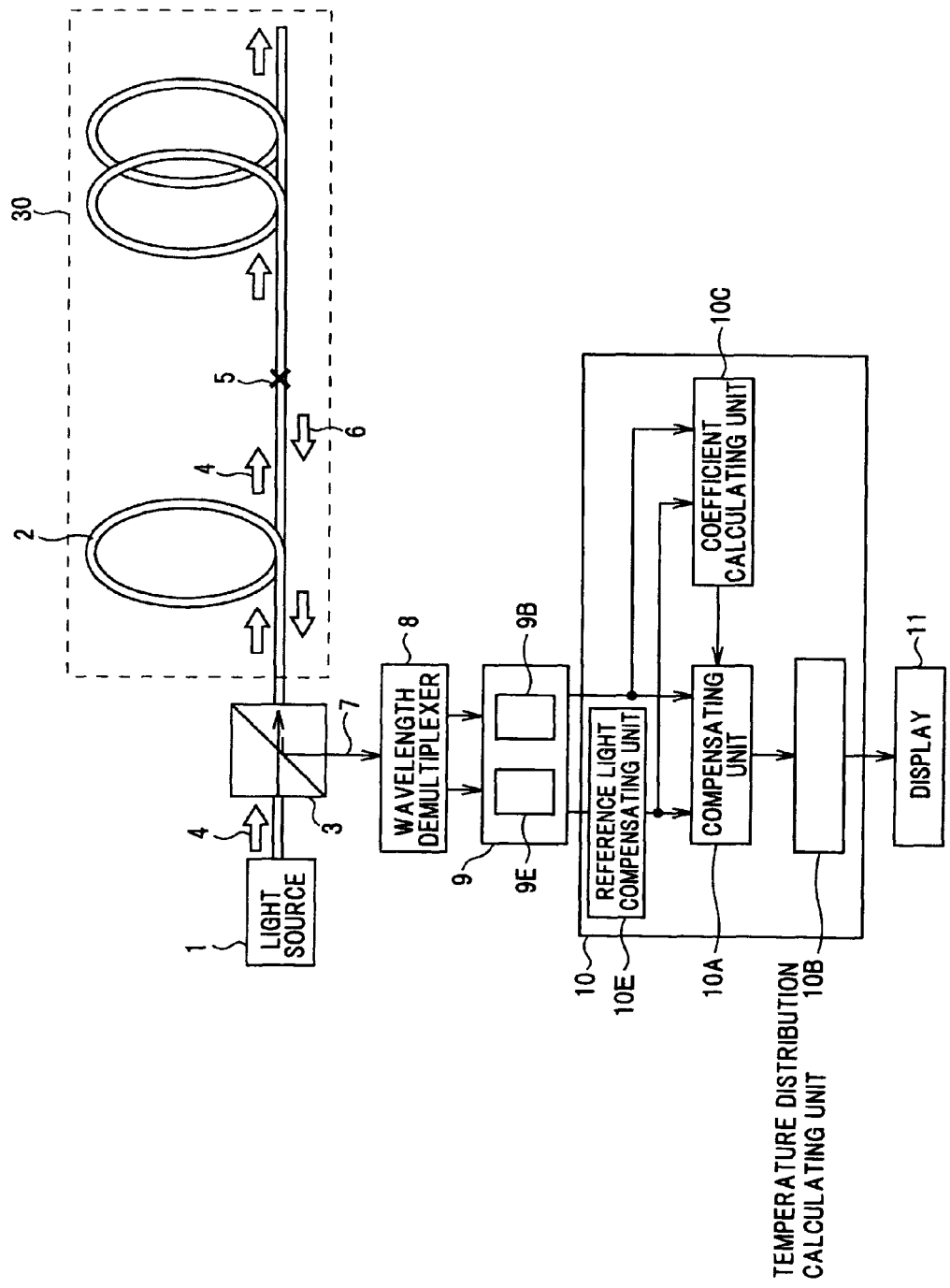

US 7,874,725 B2

OPTICAL FIBER TEMPERATURE DISTRIBUTION MEASURING APPARATUS, METHOD FOR MEASURING OPTICAL FIBER TEMPERATURE DISTRIBUTION, AND OPTICAL FIBER TEMPERATURE DISTRIBUTION MEASURING SYSTEM

BACKGROUND OF THE INVENTION

1. Field of the Invention

The present invention relates to an optical fiber temperature distribution measuring apparatus, a method for measuring optical fiber temperature distribution, and an optical fiber temperature distribution measuring system, that are for optical and remote measurement of a temperature distribution in an optical fiber.

The present application is based on International Patent Application No. PCT/JP2006/318858 the entire contents of which are incorporated herein by reference.

2. Related Art

As a method for measuring optical fiber temperature distribution for optical and remote measurement of a temperature distribution in an optical fiber, a method in which a principle of distance measuring using an OTDR (Optical Time Domain Reflectometry) is combined with a principle of thermometry by detecting a Raman scattering light is known (please see, for example, patent document 1 and non-patent document 1).

FIGS. 14A and 14B are explanatory diagrams showing a principle of measuring a temperature distribution in an optical fiber disclosed in the patent document 1, wherein FIG. 14A is a diagram showing a principle of a temperature distribution measurement, and FIG. 14B is a graph showing a wavelength distribution of a backscattering light. Measurement of the temperature distribution is conducted by a configuration including a beam splitter 3 which changes an optical path of a backscattering light 6 of an input pulse light 4 transmitted through an optical fiber 2 to be measured, which is generated at a scattering point 5, and outputs the backscattering light 6 as an output light 7 to a wavelength demultiplexer (not shown), a signal detecting unit (not shown) which detects a signal output from the wavelength demultiplexer, and a signal processing unit (not shown) or the like.

Next, a method for measuring a temperature distribution in an optical fiber will be explained below.

Firstly, the input pulse light 4 having a wavelength $\lambda_0$ generated by a light source (not shown) is input to the optical fiber 2 to be measured, then the backscattering light 6 appears at a certain scattering point 5 in the process of propagation, and returns to an input end side. Herein, when a distance from the input end to the certain scattering point 5 is L, a time elapsed from a time point of inputting the input pulse light 4 to a time point of detecting the backscattering light 6 is t, a refractive index of the optical fiber 2 to be measured is n, a light velocity in vacuum is $C_0$, and a light velocity in the optical fiber 2 to be measured is C, $$C = C_0/n \quad (1), \text{ and}$$

$$L = C \cdot t/2 \quad (2).$$

Therefore, a position at the scattering point 5 is quantitatively-calculated from the equation (2).

On the other hand, a Rayleigh light 20, a Stokes light 21, and an anti-Stokes light 22 are included in the backscattering light 6 as shown in FIG. 14B. When the wavelength of the input pulse light 4 is $\lambda_0$, a wavelength of the Rayleigh light 20 is $\lambda_0$ and a wavelength shift amount is $\Delta\lambda$, a wavelength $\lambda_S$ of the Stokes light 21 and a wavelength $\lambda_{AS}$ of the anti-Stokes light 22 are expressed as:

$$\lambda_S = \lambda_0 + \Delta\lambda \quad (3), \text{ and}$$

$$\lambda_{AS} = \lambda_0 - \Delta\lambda \quad (4)$$

Further, when a received light intensity of the Stokes light 21 at the wavelength $\lambda_S$ generated at a certain scattering point is $I_S$ and a received light intensity of the anti-Stokes light 22 at the wavelength $\lambda_{AS}$ generated at the certain scattering point is $I_{AS}$, a ratio of the received light intensity $I_{AS}$ of the anti-Stokes light 22 to the received light intensity $I_S$ of the Stokes light 21 depends on the absolute temperature T at the scattering point 5 in the optical fiber 1 to be measured, and has a relationship expressed as:

$$I_{AS}/I_S = A \cdot \exp(-h \cdot C \cdot \Delta\lambda/k_B \cdot T) \quad (5).$$

Herein, h is Planck's constant (J·S), $\Delta\lambda$ is Raman shift amount ($m^{-1}$), $k_B$ is Boltzmann constant (J/K), T is the absolute temperature (K), and A is a constant determined by a performance of a measurement system. Therefore, a temperature at the scattering point is quantitatively-calculated. In addition, the anti-Stokes 22 light may be used independently as a function of the absolute temperature T at the scattering point 5 in the optical fiber 2 to be measured, and has a relationship expressed as:

$$I_{AS} = B \cdot (1/(\exp(h \cdot C \cdot \Delta\lambda/k_B T) - 1)) \quad (6).$$

Herein, B is a constant determined by the performance of the measurement system. As described above, the temperature at the scattering point 5 can be quantitatively-calculated.

In addition, the Stokes light and the anti-Stokes light generated at a certain scattering point in the optical fiber distant from the measuring apparatus are attenuated by absorption, scattering and the like by the optical fiber in the propagation of the light through the optical fiber. In the conventional art, the calculated temperature is calibrated considering that attenuation amounts of the Stokes light and the anti-Stokes light in the propagation through the optical fiber per unit distance are constant.

As described above, the position and the temperature at the scattering point can be calculated according to the conventional method for measuring a temperature distribution in the optical fiber.

Patent document 1: Japanese Patent No. 3063063

Non-patent document 1: J. P. Dakin, et al: Distributed Optical Fibre Raman Temperature Sensor using a Semiconductor Light Source and Detector "ELECTRONICS LETTERS" Jun. 20, 1985, Vol. 21 No. 13 p. 569-570

However, according to the conventional method for measuring optical fiber temperature distribution, there is a following disadvantage. FIG. 14A shows the principle for measuring the optical fiber in the conventional art, in that when the optical fiber 2 to be measured is in a hydrogen atmosphere (i.e. hydrogen is contained in a ambient atmosphere 30) for an actual measurement, hydrogen molecules are diffused into the optical fiber 2 to be measured. The back scattering light 6 that is occurred at the scattering point 5 and returned to an apparatus side is absorbed by these diffused hydrogen molecules, so that the received light intensities detected at the signal detecting unit is decreased. Herein, even in a case that the scattering point 5 is not located in the hydrogen atmosphere, if the optical fiber to be measured is in the hydrogen atmosphere at a certain part between the scattering point 5 and the apparatus, the decrease in the received light intensities will occur. An amount of the decrease in the received light intensities due to the hydrogen molecular absorption, namely an amount of increase in an optical transmission loss has a wavelength dependency, so that the received light intensities of the Stokes light and the anti-Stokes light corresponding to a measured temperature at the scattering point include different optical transmission losses due to the hydrogen molecules. As a result, correct temperature information cannot be obtained. In addition, as disclosed in a reference document (N. Uchida and N. Uesugi, "Infrared Optical Loss Increase in Silica Fibers due to Hydrogen", J. Lightwave Technol., Vol LT-4, No. 8, pp. 1132-1138, August 1986), as to the optical transmission loss in the hydrogen atmosphere, there are an absorption loss due to molecular vibration of the hydrogen molecules diffused in the optical fiber (hydrogen molecular absorption), and a loss such as OH absorption loss due to formation of a hydroxyl group that is the optical transmission loss resulted from a chemical reaction between the hydrogen molecule and the optical fiber. In the present invention, unless described particularly, the increase in the optical transmission loss due the hydrogen molecule means the increase in the optical transmission loss due to the hydrogen molecular absorption.

As an example showing an influence of a presence of the hydrogen molecules on the optical transmission, FIGS. 15A and 15B show a relationship between a distance and a received light intensity detected by the measuring apparatus when the hydrogen molecules exist, wherein FIG. 15A is a characteristic graph of the Stokes light, and FIG. 15B is a characteristic graph of the anti-Stokes light. FIG. 16 shows a relationship between the distance and a thermometric value calculated by the conventional art when the hydrogen molecules exist.

In the relationship between the distance and the received light intensity of the optical fiber to be measured shown in FIGS. 15A and 15B, the characteristics of the Stokes light and the anti-Stokes light under the conditions where a hydrogen partial pressure is varied as 0 MPa, 0.04 MPa, 0.07 MPa, and 0.09 MP are respectively shown.

As shown in FIG. 15A, it is understood that the Stokes light has a tendency that the received light intensity is decreased by attenuation increased in accordance with an increase in a length of the optical fiber to be measured (distance), and that the received light intensity decreases remarkably in accordance with the increase in the hydrogen partial pressure. Further, the same tendency is demonstrated as to the anti-Stokes light as shown in FIG. 15B.

As described above, the optical transmission loss is increased by the diffusion of the hydrogen molecules into the optical fiber to be measured, so that an error occurs between a thermometric value and a true value as shown in FIG. 16. This error is significantly increased in accordance with the increase in the distance of the optical fiber to be measured and the increase in the hydrogen partial pressure, respectively.

SUMMARY OF THE INVENTION

Accordingly, it is an object of the invention to provide an optical fiber temperature distribution measuring apparatus, a method for measuring optical fiber temperature distribution, and an optical fiber temperature distribution measuring system, by which it is possible to measure an accurate temperature even through the optical fiber is in the hydrogen atmosphere.

According to a first feature of the invention, an optical fiber temperature distribution measuring apparatus comprises:

a light source for inputting a pulse light to an optical fiber to be measured;

a signal detecting unit for detecting a received light intensity of a predetermined light included in a backscattering light generated by an input of the pulse light in the optical fiber to be measured; and a signal processing unit for calculating a value corresponding to a variation of the received light intensity due to a hydrogen molecular absorption in the optical fiber to be measured based on the received light intensity of the predetermined light, to compensate the received light intensity of the predetermined light corresponding to a temperature of the optical fiber to be measured based on the value.

The signal detecting unit may detect received light intensities of a Stokes light and an anti-Stokes light included in the backscattering light as the predetermined light.

The signal detecting unit may detect received light intensities of a Stokes light, an anti-Stokes light, and a Rayleigh light included in the backscattering light as the predetermined light.

The signal processing unit may compensate a received light intensity of an anti-Stokes light corresponding to the temperature of the optical fiber to be measured based on a value corresponding to a variation of a received light intensity of a Stokes light.

The signal processing unit may compensate the received light intensity of the predetermined light corresponding to the temperature of the optical fiber to be measured based on a value corresponding to the variation of the received light intensity obtained from a light at a wavelength of the pulse light for temperature measuring output from the light source.

The signal processing unit may compensate the received light intensity of the predetermined light corresponding to the temperature of the optical fiber to be measured based on a value corresponding to a variation of a received light intensity obtained from a light at a wavelength of 1240 nm output from another light source.

According to a second feature of the invention, an optical fiber temperature distribution measuring system uses the optical fiber temperature distribution measuring apparatus according to the first feature of the invention, in which the optical fiber to be measured is a pure silica core optical fiber.

According to a third feature of the invention, a method for measuring optical fiber temperature distribution comprises the steps of:

inputting a pulse light from a light source to an optical fiber to be measured;

detecting a received light intensity of a predetermined light included in a backscattering light generated by an input of the pulse light in the optical fiber to be measured;

calculating a value corresponding to an variation of the received light intensity due to a hydrogen molecular absorption of the optical fiber to be measured based on the received light intensity of the predetermined light; and compensating the received light intensity of the predetermined light corresponding to the temperature of the optical fiber to be measured based on the value.

A received light intensity of an anti-Stokes light corresponding to the temperature of the optical fiber to be measured may be compensated based on a Stokes light included in the backscattering light as the predetermined light.

Received light intensities of a Stokes light and an anti-Stokes light corresponding to the temperature of the optical fiber to be measured may be compensated based on a Rayleigh light included in the backscattering light as the predetermined light.

Received light intensities of a Stokes-light and an anti-Stokes light corresponding to the temperature of the optical fiber to be measured may be compensated based on a Rayleigh light of a 1240 m light included in the backscattering light as the predetermined light.

According to a fourth feature of the invention, an optical fiber temperature distribution measuring apparatus comprises:

a light source for inputting a pulse light to an optical fiber to be measured;

a signal detecting unit for detecting received light intensities of a plurality of predetermined lights included in a backscattering light generated by an input of the pulse light in the optical fiber to be measured, the predetermined lights including an anti-Stokes light and a reference light; and a signal processing unit for calculating a temperature distribution of the optical fiber to be measured based on the received light intensity of the anti-Stokes light, the signal processing unit including:

a compensating unit for calculating a variation of the received light intensity of the reference light due to a hydrogen molecular absorption for each of measuring points, and conducting compensation by adding a variation of the received light intensity of the anti-Stokes light due to the hydrogen molecular absorption calculated based on the variation of the received light intensity of the reference light to the received light intensity of the anti-Stokes light for each of the measuring points, and a temperature distribution calculating unit for calculating the temperature distribution based on the compensated received light intensity of the anti-Stokes light.

The variation of the received light intensity of the anti-Stokes light due to the hydrogen molecular absorption may be calculated by multiplying the variation of the received light intensity of the reference light due to the hydrogen molecular absorption by a predetermined coefficient.

The optical fiber temperature distribution measuring apparatus may comprise:

a coefficient calculating unit for calculating a value by dividing the variation of the received light intensity of the anti-Stokes light due to the hydrogen molecular absorption by the variation of the received light intensity of the reference light due to the hydrogen molecular absorption as the predetermined coefficient.

The optical fiber temperature distribution measuring apparatus may comprise:

a coefficient calculating unit for calculating the predetermined coefficient as a value for compensating the received light intensity of the anti-Stokes light based on a temperature measured by a temperature sensor installed in vicinity of the optical fiber to be measured, to coincide with the measured temperature.

The optical fiber temperature distribution measuring apparatus may comprise:

a coefficient data reading unit to which the predetermined coefficient is input from the outside.

The optical fiber temperature distribution measuring apparatus may comprise:

a reference light compensating unit for determining the variation of the received light intensity of the reference light due to a temperature difference, and adding the variation of the received light intensity of the reference light due to the temperature difference to the received light intensity of the reference light for each of the measuring points of the optical fiber to be measured.

The variation of the received light intensity of the reference light due to the temperature difference may be determined based on a temperature distribution measuring result in a previous measurement.

The variation of the received light intensity of the reference light due to the temperature difference may be determined based on a temperature distribution measuring result in a latest measurement.

According to a fifth feature of the invention, an optical fiber temperature distribution measuring system uses the optical fiber temperature distribution measuring apparatus according to the fourth feature of the invention, in which the optical fiber to be measured is a pure silica core optical fiber.

According to a sixth feature of the invention, a method for measuring optical fiber temperature distribution comprises the steps of:

inputting a pulse light from a light source to an optical fiber to be measured;

detecting received light intensities of a plurality of predetermined lights included in a backscattering light generated by the input of the pulse light in the optical fiber to be measured, the predetermined lights including an anti-Stokes light and a reference light; and calculating a temperature distribution of the optical fiber to be measured based on the received light intensity of the anti-Stokes light, wherein the method comprises the steps of:

calculating a variation of the received light intensity of the reference light due to a hydrogen molecular absorption for each of measuring points;

conducting compensation by adding a variation of the received light intensity of the anti-Stokes light due to the hydrogen molecular absorption calculated based on the variation of the received light intensity of the reference light to the received light intensity of the anti-Stokes light for each of the measuring points; and calculating the temperature distribution based on the compensated received light intensity of the anti-Stokes light.

The variation of the received light intensity of the anti-Stokes light due to the hydrogen molecular absorption may be calculated by multiplying the variation of the received light intensity of the reference light due to the hydrogen molecular absorption by a predetermined coefficient.

The predetermined coefficient may be a value obtained by dividing the variation of the received light intensity of the anti-Stokes light due to the hydrogen molecular absorption by the variation of the received light intensity of the reference light due to the hydrogen molecular absorption.

The predetermined coefficient may be a value for compensating the received light intensity of the anti-Stokes light based on a temperature measured by a temperature sensor installed in vicinity of the optical fiber to be measured, to coincide with the measured temperature.

The predetermined coefficient may be input from the outside.

The method for measuring optical fiber temperature distribution may further comprise:

conducting a first measurement of the temperature distribution at a stage in that the hydrogen molecules are not diffused in the optical fiber to be measured and an influence of the hydrogen molecular absorption is small;

conducting a second measurement of the temperature distribution to determine the variation of the received light intensity of the reference light due to the temperature difference based on the result of the first measurement of the temperature distribution; and adding the variation of the received light intensity of the reference light due to the temperature difference to the received light intensity of the reference light for each of the measuring points of the optical fiber to be measured.

As shown in FIGS. 17A and 17B, the optical transmission loss of the optical fiber is varied for the respective wavelengths. Further, as shown in the graphs, the optical transmission loss is varied by being exposed in the atmosphere with different hydrogen partial pressures (0 MPa, 0.05 MPa, 0.09 MPa, 0.15 MPa, and 0.20 MPa). As shown in FIGS. 17A and 17B, there is a tendency that the optical transmission loss is increased when the hydrogen partial pressure is increased.

So as to clarify the tendency shown in FIGS. 17A and 17B, FIGS. 18A and 18B show an increment of the optical transmission loss in the optical fiber for respective hydrogen partial pressures (0.05 MPa, 0.09 MPa, 0.15 MPa, and 0.20 MPa) as a reference of an optical transmission loss in the state of no hydrogen (namely, 0 MPa). Further, FIGS. 19A and 19B show a proportion of the increase in the optical transmission loss in other wavelengths 850 nm, 1240 nm, 1300 nm, 1450 nm, 1650 nm, and 1690 nm with respect to 1550 nm in which the optical transmission loss in a silica optical fiber is low, as examples. From these graphs, it is understood that the increment of the optical transmission loss in the optical fiber is proportional to the hydrogen partial pressure.

As understood from the above, an increment $\Delta L_j$ of an optical transmission loss of an optical fiber due to the hydrogen molecules at a wavelength j and an increment $\Delta L_i$ of the optical transmission loss of the optical fiber due to the hydrogen molecules at another wavelength i have a relationship expressed as:

$$\Delta L_j / \Delta L_i = k \text{ (k is a constant)} \quad (7).$$

When the ratio k corresponding to the increments of the optical transmission loss at the wavelengths i and j is established, the increment $\Delta L_i$ of the optical transmission loss due to the hydrogen molecules at another wavelength i can be calculated.

Herein, the increments $\Delta L_i$, $\Delta L_j$ of the optical transmission loss are caused by the hydrogen molecular absorption, and k does not depend on the kind of the optical fiber. Further, while k depends on the wavelength, k does not depend on high and low of the temperature or small and large of hydrogen quantity.

Further, the increment of the optical transmission loss due to the hydrogen molecules at one wavelength j can be derived, when the increment of the optical transmission loss due to the hydrogen molecules at another wavelength i is determined. Accordingly, it is possible to calculate a variation of the received light intensity due to the hydrogen molecules at the wavelength j, by calculating the constant k based on a ratio of the variation of the received light intensity due to the hydrogen molecules at the wavelength j to a variation of the received light intensity due to the hydrogen molecules at another wavelength i by using the light at another wavelength i as a reference light, then measuring the variation of the received light intensity due to the hydrogen molecules at another wavelength i. Further, it is possible to calculate the variation of the received light intensity due to the hydrogen molecules at the wavelength j, by measuring the variation of the received light intensity due to the hydrogen molecules at another wavelength i without conducting the measurement for calculating the constant k every time, when the constant k is determined based on measurement results in the past.

Effects of the Invention

According to the present invention, it is possible to measure the accurate temperature even though the optical fiber is in the hydrogen atmosphere.

BRIEF DESCRIPTION OF THE DRAWINGS

Next, preferred embodiments according to the invention will be explained in conjunction with appended drawings:

FIG. 23 is a schematic block-diagram showing an optical fiber temperature distribution measuring system in a seventh preferred embodiment according to the invention.

REFERENCE NUMERALS 1 light source
1A 1240 nm light source
1B temperature measuring light source
2 optical fiber to be measured
3 beam splitter
4 input pulse light
5 scattering point
6 backscattering light
7 output light
8 wavelength demultiplexer
9 signal detecting unit
9A Stokes light detecting part
9B anti-Stokes light detecting part
9C Rayleigh light detecting part
9D 1240 nm light detecting part
9E reference light detecting part
10 signal processing unit
10A compensating unit
10B temperature distribution calculating unit
10C coefficient calculating unit
10D coefficient data reading unit
10E reference light compensating unit
11 display
12 temperature sensor
13 temperature conversion unit
20 Rayleigh light
21 Stokes light
22 anti-Stokes light
30 ambient atmosphere DETAILED DESCRIPTION OF THE PREFERRED EMBODIMENTS BEST MODE FOR CARRYING OUT THE INVENTION First Preferred Embodiment FIG. 1 is a schematic block-diagram showing an optical fiber temperature distribution measuring system in a first preferred embodiment according to the invention. This optical fiber temperature distribution measuring system comprises a light source 1, an optical fiber 2 to be measured, a beam splitter 3 for inputting an input pulse light 4 to the optical fiber 2 to be measured, changing an optical path of a backscattering light 6 generated at a scattering point 5 of the optical fiber 2 to be measured, and outputting the backscattering light 6 as an output light 7 to a wavelength demultiplexer 8, the wavelength demultiplexer 8 for separating the output light of the beam splitter 3 into a Stokes light and an anti-Stokes light, a signal detecting unit 9 comprising a Stokes light detecting part 9A for detecting the Stokes light separated by the wavelength demultiplexer 8, and an anti-Stokes light detecting part 9B for detecting the Stokes light separated by the wavelength demultiplexer 8, a signal processing unit 10 for calculating a distance to the scattering point (measuring point) 5 of the optical fiber 2 to be measured based on a time difference between an input timing of the input pulse light 4 and a detection timing of the backscattering light 6 generated in the optical fiber 2 to be measured, and for calculating a temperature of the optical fiber 2 to be measured by compensating the anti-Stokes light based on a signal detected by the signal detecting unit 9, and a display 11 for displaying a calculation result of the signal processing unit 10 or the like. FIG. 1 shows a state where the optical fiber 2 to be measured is in the hydrogen atmosphere. Herein, an optical fiber temperature distribution apparatus in the present invention represents a part comprising the light source 1, the beam splitter 3, the wavelength demultiplexer 8, the signal detecting unit 9, the signal processing unit 10 and the display 11, except the optical fiber 2 to be measured as shown in FIG. 1. The optical fiber temperature distribution measuring system represents a total configuration including the optical fiber temperature distribution apparatus and the optical fiber 2 to be measured.

FIG. 2 to FIG. 4 are flow charts showing thermometric processes in the optical fiber temperature distribution measuring system shown in FIG. 1. In conjunction with FIG. 2 to FIG. 4, the thermometry of the optical fiber to be measured by compensating the received light intensity of the anti-Stokes light with the Stokes light will be explained below.

Figure 1:
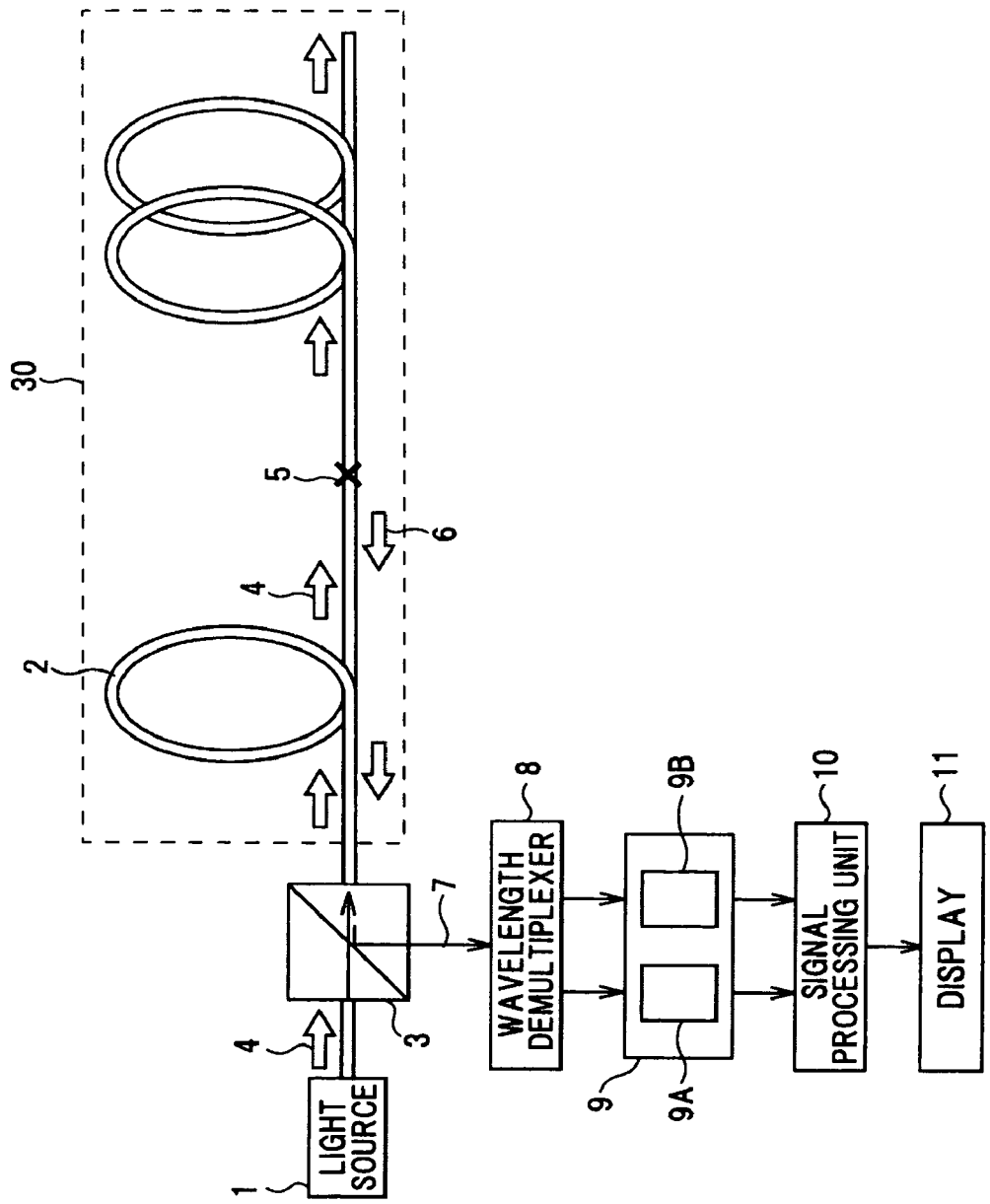
FIG. 1 is a schematic block-diagram showing an optical fiber temperature distribution measuring system in a first preferred embodiment according to the invention.
Figure 2:
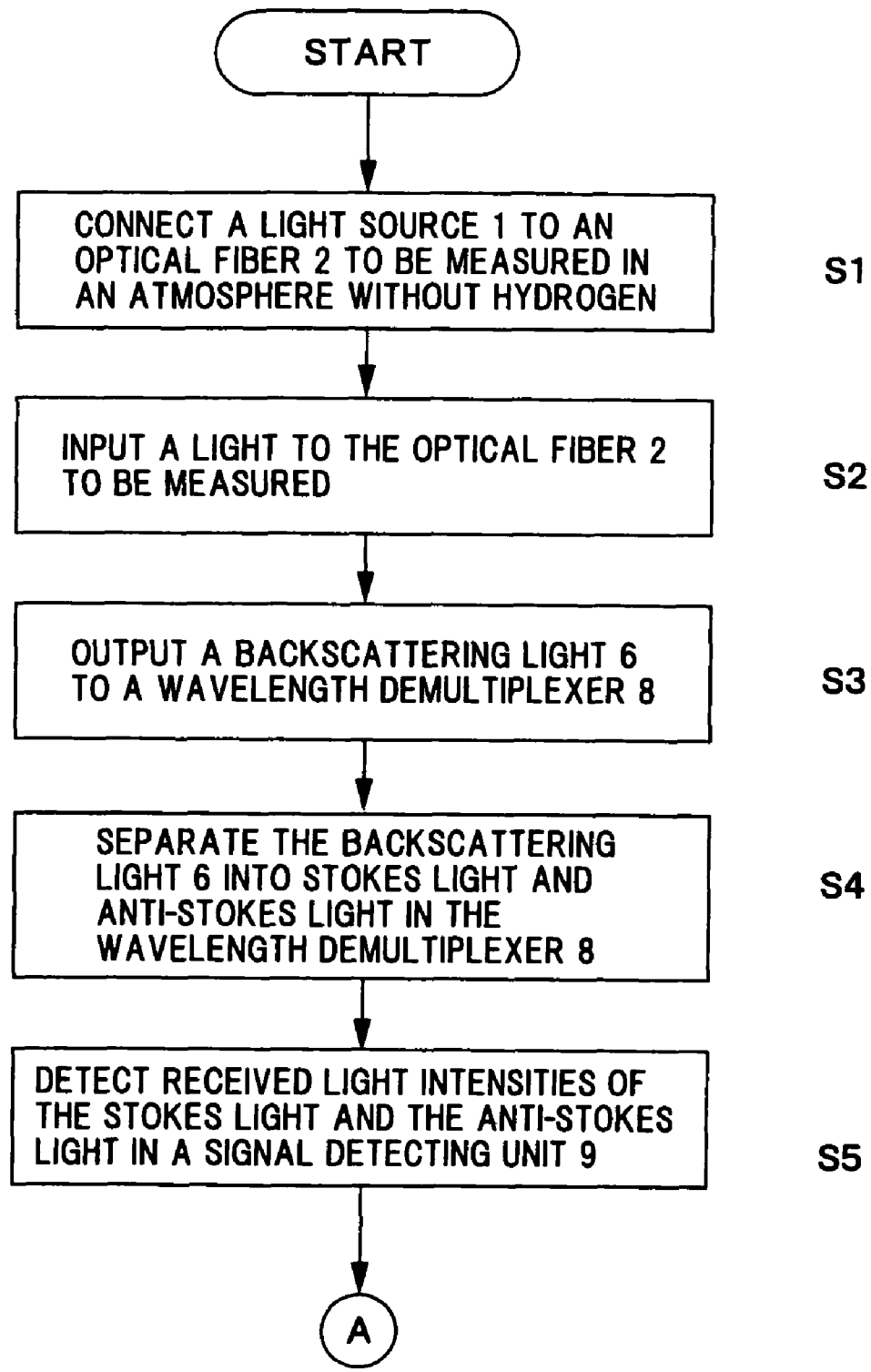
FIG. 2 is a flow chart showing a process for calculating the received light intensity $I_{S0}(x)$ of the Stokes light and the received light intensity $I_{AS0}(x)$ of the anti-Stokes light in the first preferred embodiment according to the invention.
Figure 3:
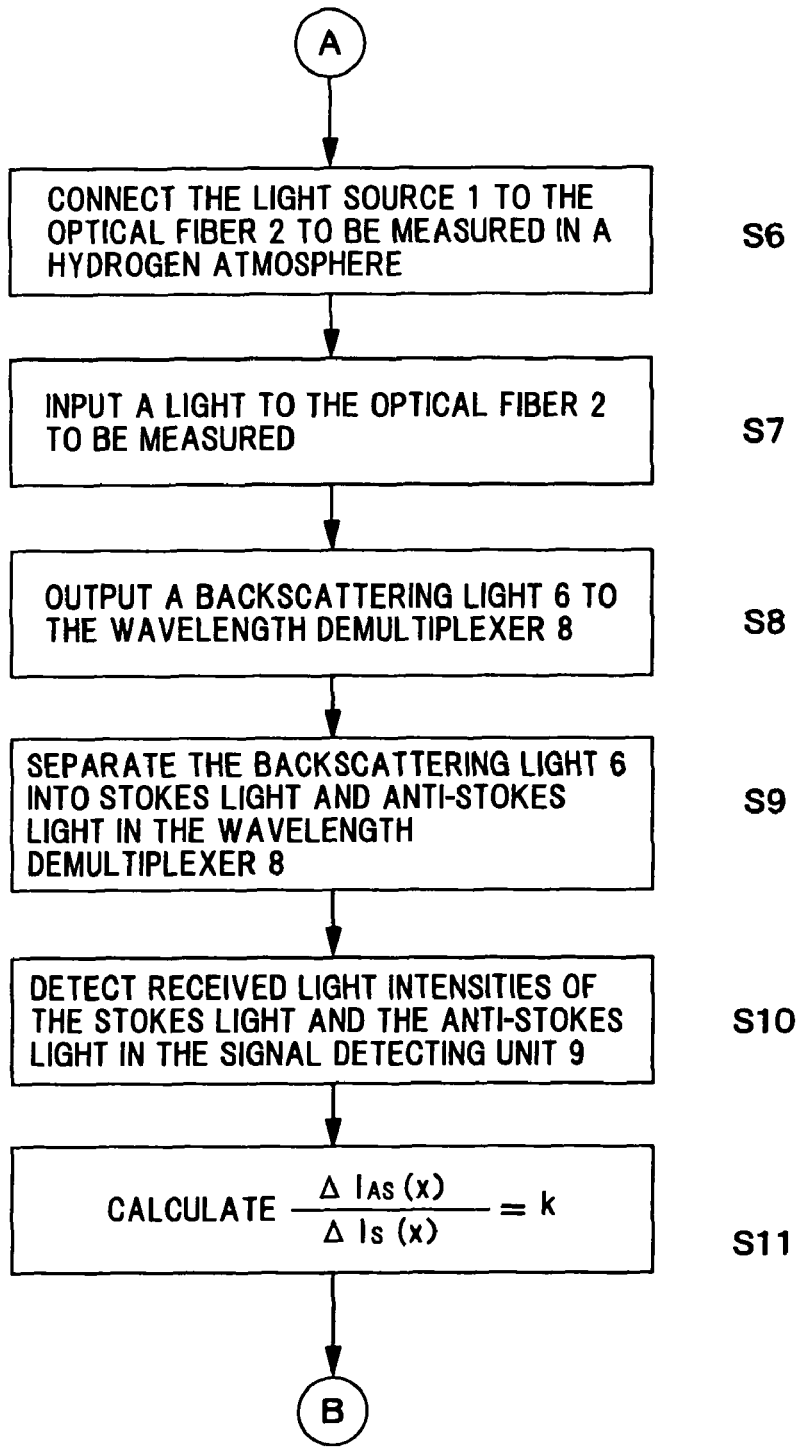
FIG. 3 is a flow chart showing a process for determining a value of the constant k in the first preferred embodiment according to the invention.
Figure 4:
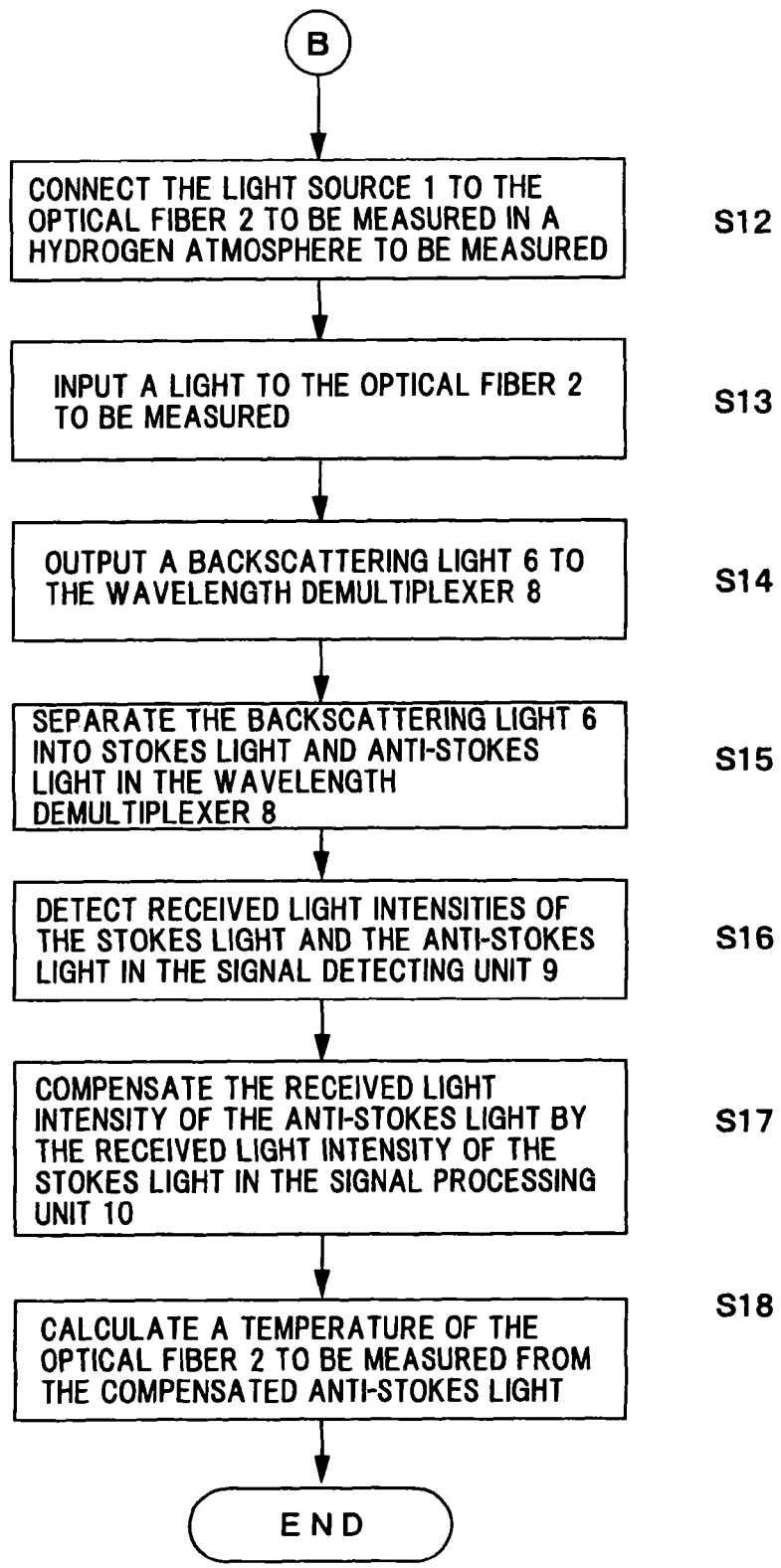
FIG. 4 is a flow chart showing a thermometric process in the optical fiber temperature distribution measuring system in the first preferred embodiment according to the invention.

At first, the optical fiber 2 to be measured which is used for measurement in an atmosphere without hydrogen (in a state where no hydrogen exists in an ambient atmosphere 30) is connected to the light source 1 (S1), and the input pulse light 4 with a wavelength λ is input from the light source 1 to the optical fiber 2 to be measured (S2). In the optical fiber 2 to be measured, the backscattering light 6 (λ, λ+Δλ, and λ−Δλ) generated at the certain scattering point 5 in a process of propagation appears and returns to an input end side. The beam splitter 3 changes an optical path of the backscattering light 6 and outputs it to the wavelength demultiplexer 8 (S3).

The wavelength demultiplexer 8 separates the Stokes light (λ+Δλ), and the anti-Stokes light (λ−Δλ) included in the backscattering light 6 and outputs them to the signal detecting unit 9 (S4). The signal detecting unit 9 receives the Stokes light at the Stokes light detecting part 9A to detect a received light intensity $I_{S0}(x)$ of the Stokes light. Herein, x represents a distance between an input end and the scattering point 5. On the other hand, the anti-Stokes light is received at the anti-Stokes light detecting part 9B to detect a received light intensity $I_{AS0}(x)$ of the anti-Stokes light (S5).

Next, the optical fiber 2 to be measured in a hydrogen atmosphere (in a state where the hydrogen exists in the ambient atmosphere) is connected to the light source 1 (S6), and the input pulse 4 at the wavelength λ is input from the light source 1 to the optical fiber 2 to be measured (S7). The backscattering light 6 (λ, λ+Δλ, and λ−Δλ) generated by the input pulse light 4 at the certain scattering point 5 appears and returns to the input end side. The beam splitter 3 changes the optical path of the backscattering light 6 and outputs it to the wavelength demultiplexer 8 (S8).

The wavelength demultiplexer 8 separates the Stokes light (λ+Δλ) and the anti-Stokes light (λ−Δλ) included in the backscattering light 6 and outputs them to the signal detecting unit 9 (S9). The signal detecting unit 9 receives the Stokes light at the Stokes light detecting part 9A to detect a received light intensity $I_{S1}(x)$ of the Stokes light. On the other hand, the anti-Stokes light is received at the anti-Stokes light detecting part 9B to detect a received light intensity $I_{AS1}(x)$ of the anti-Stokes light (S10).

Next, a variation $\Delta I_S(x)$ of the received light intensity of the Stokes light due to the hydrogen molecules, namely, a difference between the received light intensity $I_{S1}(x)$ of the Stokes light transmitted through the optical fiber 2 to be measured in the hydrogen atmosphere and the received light intensity $I_{S0}(x)$ of the Stokes light transmitted through the optical fiber 2 to be measured in the atmosphere without hydrogen is calculated ($\Delta I_S(x)=I_{S1}(x)-I_{S0}(x)$). Similarly, a variation $\Delta I_{AS}(x)$ of the received light intensity of the anti-Stokes light due to the hydrogen molecules, namely, a difference between the received light intensity $I_{AS1}(x)$ of the anti-Stokes light transmitted through the optical fiber 2 to be measured in the hydrogen atmosphere and the received light intensity $I_{AS0}(x)$ of the anti-Stokes light transmitted through the optical fiber 2 to be measured in the atmosphere without hydrogen is calculated ($\Delta I_{AS}(x)=I_{AS1}(x)-I_{AS0}(x)$). Further, a ratio of the variation $\Delta I_{AS}(x)$ of the received light intensity of the anti-Stokes light due to the hydrogen molecules to the variation $\Delta I_S(x)$ of the received light intensity of the Stokes light due to the hydrogen molecules, which is expressed as:

$$\Delta I_{AS}(x)/\Delta I_S(x)=k \qquad (8)$$

is calculated (S11).

As described above, it is possible to calculate a value of the constant k based on the variations of the received light intensities of the Stokes light and the anti-Stokes light, it is also possible to calculate the value of the constant k based on data of a wavelength dependency of the increment of the optical transmission loss of the optical fiber due to the hydrogen molecules, which is shown in FIGS. 18A and 18B, and FIGS. 19A and 19B as well.

Next, the optical fiber 2 to be measured in a hydrogen atmosphere where the measurement is actually conducted (in a state where the hydrogen exists in an ambient atmosphere 30 in which the measurement is actually conducted) is connected to the light source 1 (S12), and the input pulse 4 at the wavelength λ is input from the light source 1 to the optical fiber 2 to be measured (S13). The beam splitter 3 changes the optical path of the backscattering light 6 generated by the input pulse light 4 and outputs it to the wavelength demultiplexer 8 (S14), and separates the Stokes light and the anti-Stokes light and outputs them to the signal detecting unit 9 (S15). The signal detecting unit 9 receives the Stokes light at the Stokes light detecting part 9A to detect the received light intensity $I_S(x)$ of the Stokes light, and receives the anti-Stokes light at the anti-Stokes light detecting part 9B to detect the received light intensity $I_{AS}(x)$ of the anti-Stokes light (S16).

Next, a temperature of the optical fiber 2 to be measured is calculated in the signal processing unit 10 by arithmetic processing of a signal derived from the received light intensity of the Stokes light and the received light intensity of the anti-Stokes light.

When a received light intensity of the anti-Stokes light from which influence of the hydrogen is removed is $I_{AS}'(x)$, $$I_{AS}'(x)=I_{AS}(x)-\Delta I_{AS}(x) \qquad (9).$$

By substituting $\Delta I_{AS}(x)=k \cdot \Delta I_S(x)$ derived from the equation (8) for the equation (9), it is established as:

$$I_{AS}'(x)=I_{AS}(x)-k \cdot \Delta I_S(x) \qquad (10).$$

The variation of the received light intensity of the Stokes light due to the hydrogen molecules is established as:

$$\Delta I_S(x)=I_{S1}(x)-I_{S0}(x) \qquad (11).$$

By substituting this value for the equation (10), it is established as:

$$I_{AS}'(x)=I_{AS}(x)-k \cdot (I_{S1}(x)-I_{S0}(x)) \qquad (12).$$

As a result, the received light intensity of the anti-Stokes light, from which the influence of the hydrogen is removed by using the variation of the received light intensity of the Stokes light, is derived (S17).

As described above, since the received light intensity of the compensated anti-Stokes light obtained as explained above is a function of the absolute temperature T at the scattering point 5 in the optical fiber 2 to be measured, it is possible to accurately calculate the temperature at the scattering point 5 based on the equation (6) (S18).

Figure 5A:
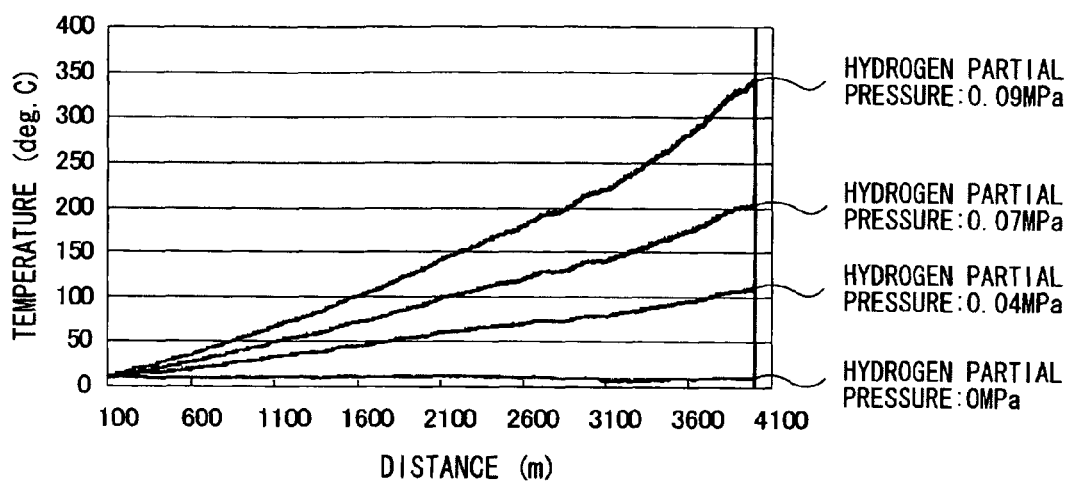
FIG. 5A is a characteristic graph showing a thermometric result in a case that the received light intensity of the anti-Stokes light is not compensated in a thermometry based on the received light intensity of the anti-Stokes light.
Figure 5B:
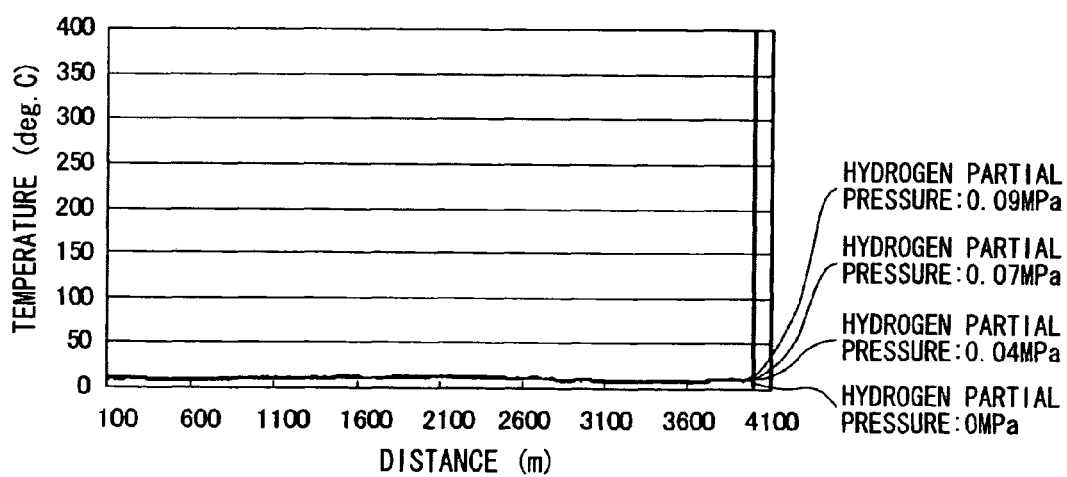
FIG. 5B is a characteristic graph showing a thermometric result in a case that the received light intensity of the anti-Stokes light is compensated in a thermometry based on the received light intensity of the anti-Stokes light.

FIGS. 5A and 5B are characteristic diagrams showing a thermometry based on the received light intensity of the anti-Stokes light, wherein FIG. 5A shows a thermometric result in which the received light intensity of the anti-Stokes light is not compensated, and FIG. 5B shows a thermometric result in which the received light intensity of anti-Stokes light is compensated. Herein, the thermometric results at hydrogen partial pressures of 0 MPa, 0.04 MPa, 0.07 MPa, and 0.09 MPa are shown.

Effect of the First Preferred Embodiment

According to the first preferred embodiment, it is possible to calculate the value (ratio) k corresponding to the variation of the received light intensity due to the hydrogen molecular absorption of the optical fiber 2 to be measured, based on the received light intensities of the Stokes light and the anti-Stokes light that are obtained by conducting the thermometry of the optical fiber 2 to be measured in the atmosphere without hydrogen and the hydrogen atmosphere. Therefore, it is possible to compensate the received light intensity of the anti-Stokes light with the received light intensity of the Stokes light, which are obtained from the input pulse light 4 input to the optical fiber 2 to be measured in the hydrogen atmosphere in which the actual measurement is conducted.

Therefore, it is possible to obtain accurate thermometric results as shown in the measuring results of FIG. 5B, in which the influence of the hydrogen in the measurement environment is removed from the thermometric results including the optical transmission loss due to the hydrogen molecules as shown in the measuring results of FIG. 5A.

Second Preferred Embodiment

Figure 6:
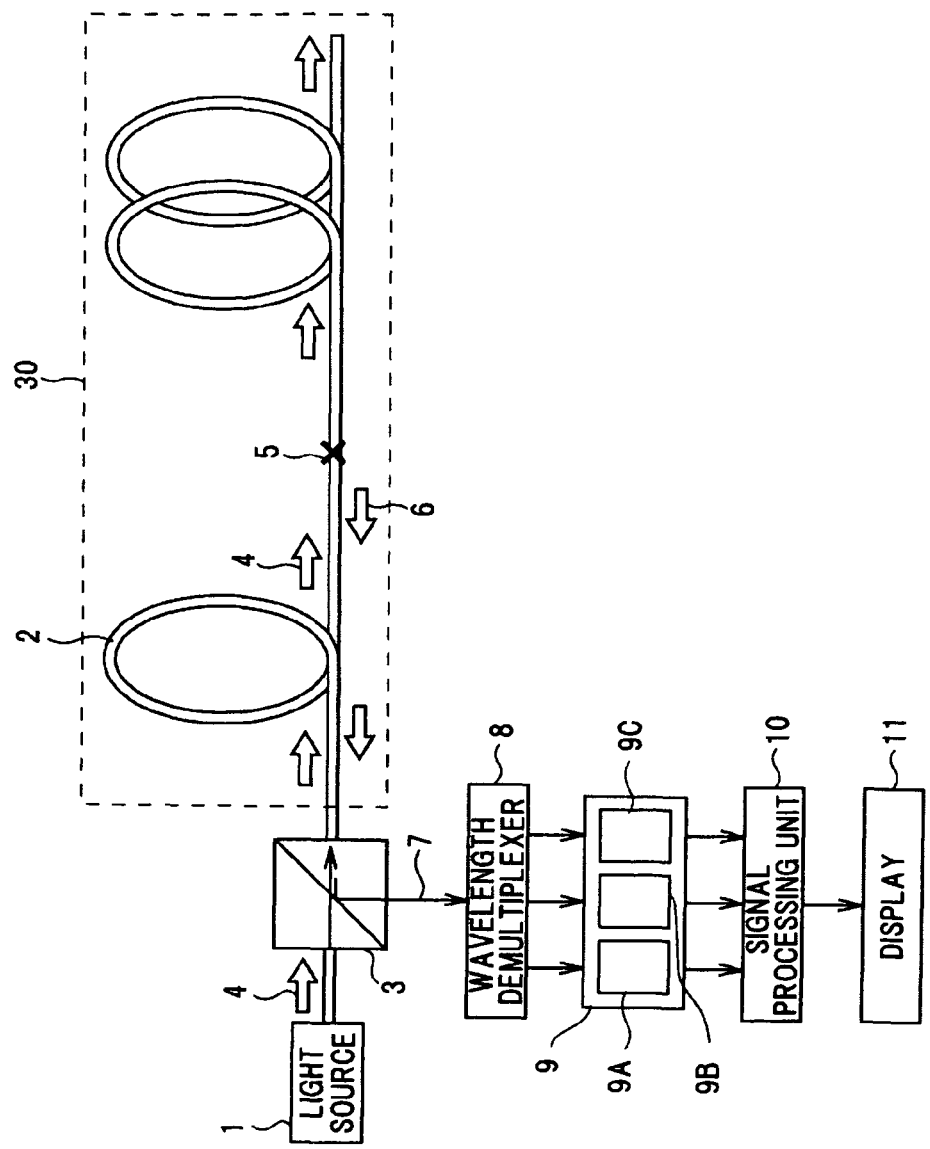
FIG. 6 is a schematic block-diagram showing an optical fiber temperature distribution measuring system in a second preferred embodiment according to the invention.

FIG. 6 is a schematic block-diagram showing an optical fiber temperature distribution measuring apparatus in a second preferred embodiment according to the invention. The second preferred embodiment differs from the first preferred embodiment, in that the configuration comprises a wavelength demultiplexer 8 for separating the light output from the beam splitter 3 into a Stokes light, an anti-Stokes light, and a Rayleigh light, and a signal detecting unit 9 comprising a Stokes light detecting part 9A for detecting the Stokes light separated by the wavelength demultiplexer 8, an anti-Stokes light detecting part 9B for detecting the anti-Stokes light separated by the wavelength demultiplexer 8, and a Rayleigh light detecting part 9C for detecting the Rayleigh light separated by the wavelength demultiplexer 8. FIG. 6 also shows a state where the optical fiber 2 to be measured is in the hydrogen atmosphere. In addition, common reference numerals are assigned to parts having the same configuration and the same function as those in the first preferred embodiment.

Figure 7:
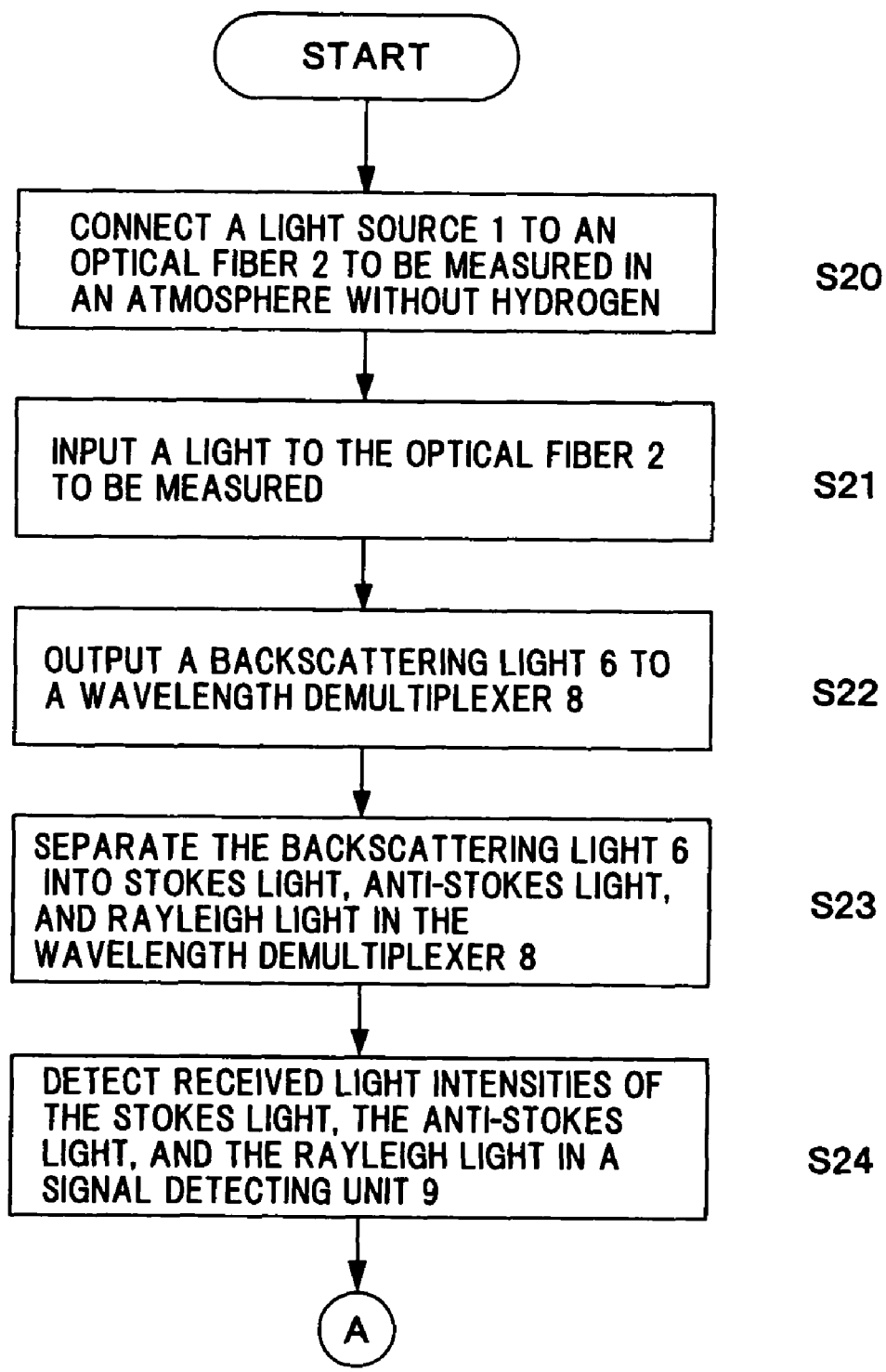
FIG. 7 is a flow chart showing a process for calculating the received light intensity $I_{S0}(x)$ of the Stokes light, the received light intensity $I_{AS0}(x)$ of the anti-Stokes light, and the received light intensity $I_{R0}(x)$ of a Rayleigh light in the second preferred embodiment according to the invention.
Figure 8:
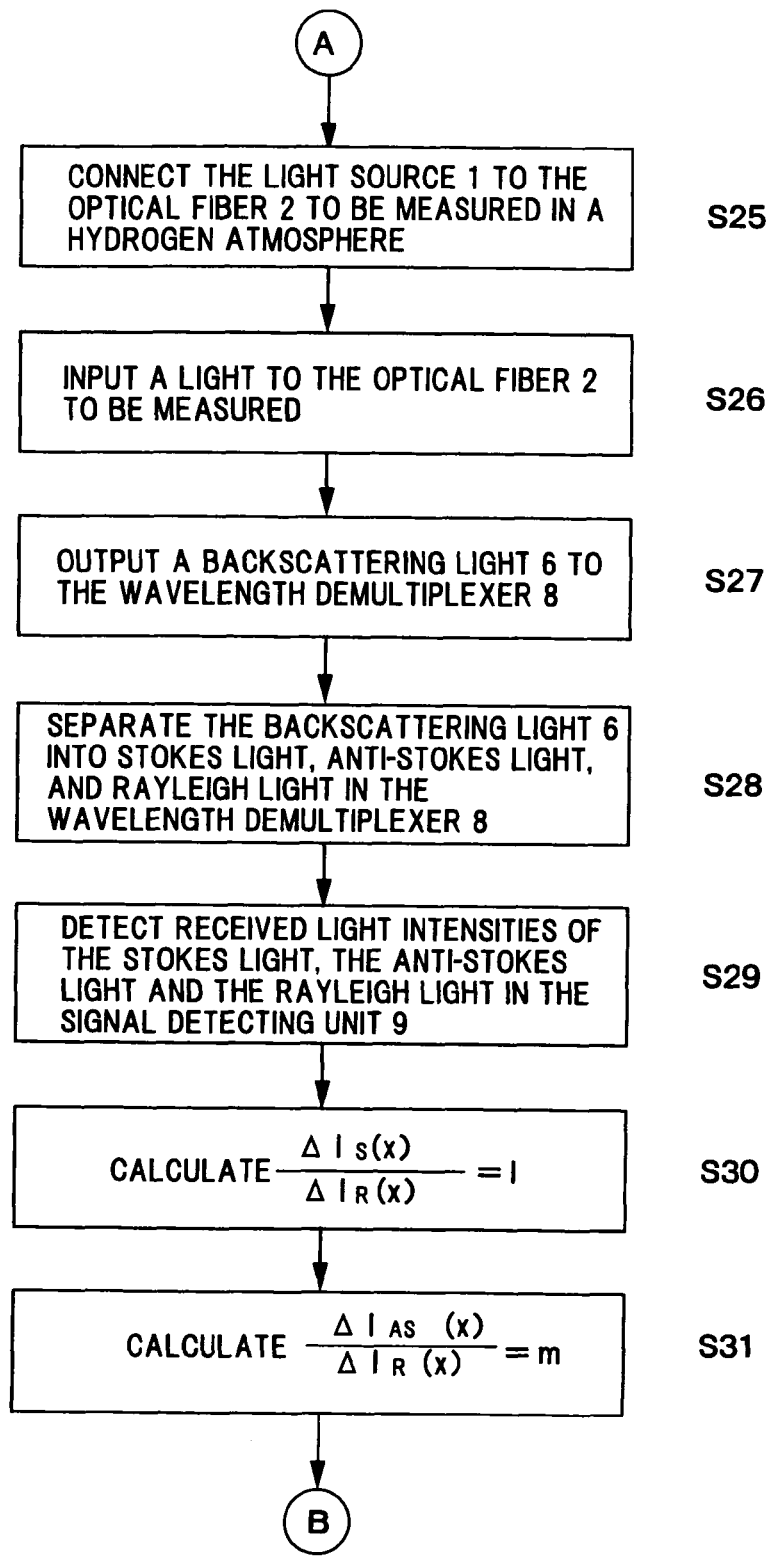
FIG. 8 is a flow chart showing a process for determining values of the constants l and m in the second preferred embodiment according to the invention.
Figure 9:
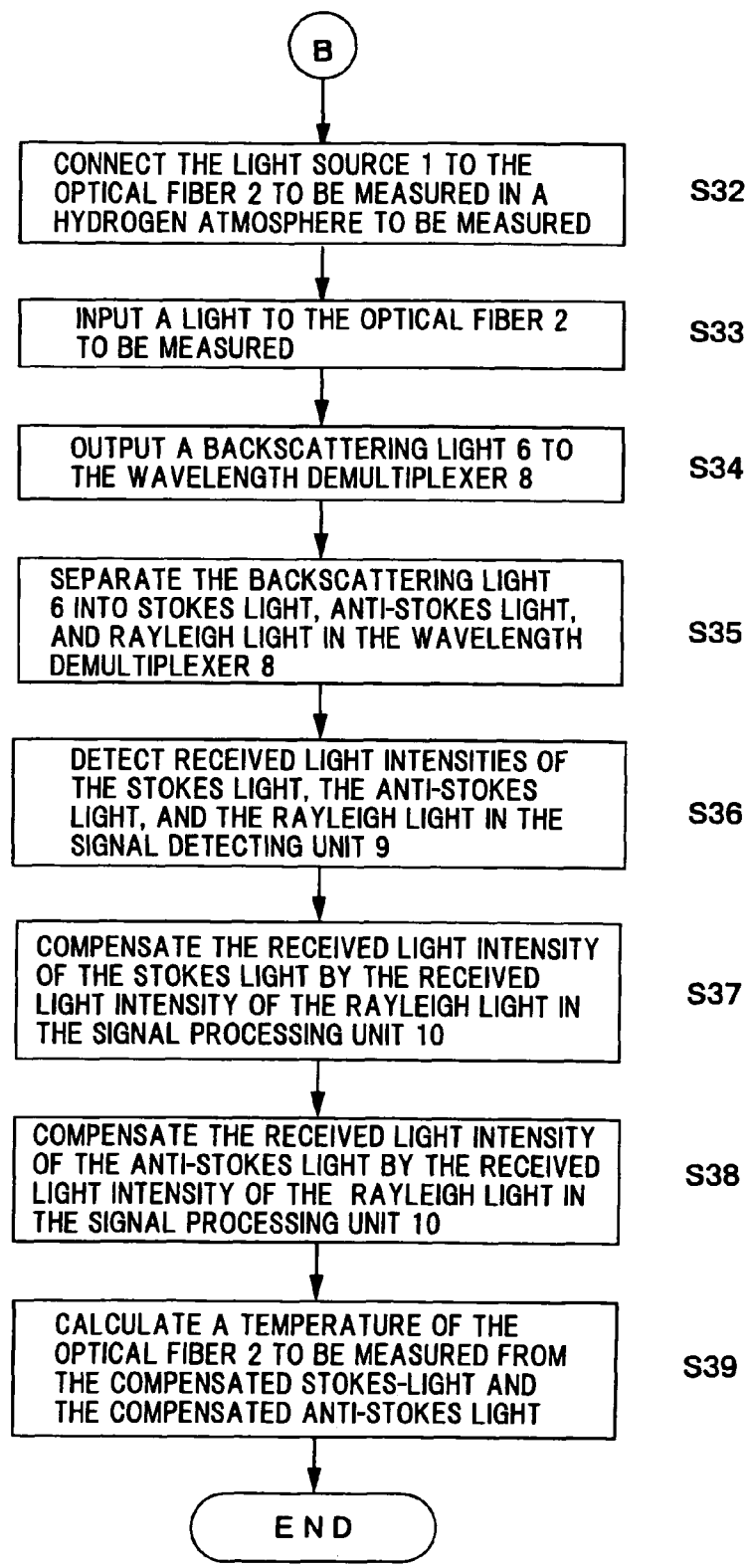
FIG. 9 is a flow chart showing a thermometric process in the optical fiber temperature distribution measuring system in the second preferred embodiment according to the invention.

FIGS. 7 to 9 are flow charts showing thermometric processes in the optical fiber temperature distribution measuring system shown in FIG. 6. In conjunction with FIG. 7 to FIG. 9, the thermometry of the optical fiber to be measured by compensating the received light intensities of the Stokes light and the anti-Stokes light based on the received light intensity of the Rayleigh light will be explained below.

At first, the optical fiber 2 to be measured which is used for measurement in an atmosphere without hydrogen is connected to the light source 1 (S20), and the input pulse light 4 with a wavelength λ is input from the light source 1 to the optical fiber 2 to be measured (S21). In the optical fiber 2 to be measured, the backscattering light 6 (λ, λ+Δλ, and λ−Δλ) generated at the certain scattering point 5 in a process of propagation appears and returns to an input end side. The beam splitter 3 changes an optical path of the backscattering light 6 and outputs it to the wavelength demultiplexer 8 (S22).

The wavelength demultiplexer 8 separates the Stokes light (λ+Δλ), the anti-Stokes light (λ−Δλ), and the Rayleigh light (λ) included in the backscattering light 6 and outputs them to the signal detecting unit 9 (S23). The signal detecting unit 9 receives the Stokes light at the Stokes light detecting part 9A to detect a received light intensity $I_{S0}(x)$ of the Stokes light, receives the anti-Stokes light at the anti-Stokes light detecting part 9B to detect a received light intensity $I_{AS0}(x)$ of the anti-Stokes light, and receives the Rayleigh light at the Rayleigh light detecting part 9C to detect a received light intensity $I_{R0}(x)$ of the Rayleigh light (S24).

Next, the optical fiber 2 to be measured in the hydrogen atmosphere is connected to the light source 1 (S25), and the input pulse 4 at the wavelength λ is input from the light source 1 to the optical fiber 2 to be measured (S26). The backscattering light 6 (λ, λ+Δλ, and λ−Δλ) generated by the input pulse light 4 at the certain scattering point 5 appears and returns to the input end side. The beam splitter 3 changes the optical path of the backscattering light 6 and outputs it to the wavelength demultiplexer 8 (S27).

The wavelength demultiplexer 8 separates the Stokes light (λ+Δλ), the anti-Stokes light (λ−Δλ), and the Rayleigh light (λ) included in the backscattering light 6 and outputs them to the signal detecting unit 9 (S28). The signal detecting unit 9 receives the Stokes light at the Stokes light detecting part 9A to detect a received light intensity $I_{S1}(x)$ of the Stokes light, receives the anti-Stokes light at the anti-Stokes light detecting part 9B to detect a received light intensity $I_{AS1}(x)$ of the anti-Stokes light, and receives the Rayleigh light at the Rayleigh light detecting part 9C to detect a received light intensity $I_{R1}(x)$ of the Rayleigh light (S29).

Next, a variation $\Delta I_S(x)$ of a received light intensity of the Stokes light due to the hydrogen molecules, namely, a difference between the received light intensity $I_{S1}(x)$ of the Stokes light transmitted through the optical fiber 2 to be measured in the hydrogen atmosphere and the received light intensity $I_{S0}(x)$ of the Stokes light transmitted through the optical fiber 2 to be measured in the atmosphere without hydrogen is calculated ($\Delta I_S(x)=I_{S1}(x)-I_{S0}(x)$). Similarly, a variation $\Delta I_R(x)$ of a received light intensity of the Rayleigh light due to the hydrogen molecules, namely, a difference between the received light intensity $I_{R1}(x)$ of the Rayleigh light transmitted through the optical fiber 2 to be measured in the hydrogen atmosphere and the received light intensity $I_{R0}(x)$ of the Rayleigh light transmitted through the optical fiber 2 to be measured in the atmosphere without hydrogen is calculated ($\Delta I_R(x)=I_{R1}(x)-I_{R0}(x)$). Further, a ratio of the variation $\Delta I_S(x)$ of the received light intensity of the Stokes light due to the hydrogen molecules to the variation $\Delta I_R(x)$ of the received light intensity of the Rayleigh light due to the hydrogen molecules, which is expressed as:

$$\Delta I_S(x)/\Delta I_R(x) = 1 \qquad (13)$$

is calculated (S30).

Next, a variation $\Delta I_{AS}(x)$ of a received light intensity of the anti-Stokes light due to the hydrogen molecules, namely, a difference between the received light intensity $I_{AS1}(x)$ of the anti-Stokes light transmitted through the optical fiber 2 to be measured in the hydrogen atmosphere and the received light intensity $I_{AS0}(x)$ of the anti-Stokes light transmitted through the optical fiber 2 to be measured in the atmosphere without hydrogen is calculated ($\Delta I_{AS}(x)=I_{AS1}(x)-I_{AS0}(x)$). Further, a ratio of the variation $\Delta I_{AS}(x)$ of the received light intensity of the anti-Stokes light due to the hydrogen molecules to the variation $\Delta I_R(x)$ of the received light intensity of the Rayleigh light due to the hydrogen molecules, which is expressed as:

$$\Delta I_{AS}(x)/\Delta I_R(x) = m \qquad (14)$$

is calculated (S31).

Next, the optical fiber 2 to be measured in a hydrogen atmosphere where the measurement is actually conducted is connected to the light source 1 (S32), and the input pulse 4 at the wavelength λ is input from the light source 1 to the optical fiber 2 to be measured (S33). The beam splitter 3 changes the optical path of the backscattering light 6 generated by the input pulse light 4 and outputs it to the wavelength demultiplexer 8 (S34), and separates the Stokes light, the anti-Stokes light, and the Rayleigh light and outputs them to the signal detecting unit 9 (S35). The signal detecting unit 9 receives the Stokes light at the Stokes light detecting part 9A to detect a received light intensity $I_S(x)$ of the Stokes light, receives the anti-Stokes light at the anti-Stokes light detecting part 9B to detect a received light intensity $I_{AS}(x)$ of the anti-Stokes light, and receives the Rayleigh light at the Rayleigh light detecting part 9C to detect a received light intensity $I_R(x)$ of the Rayleigh light (S36).

Next, a temperature of the optical fiber 2 to be measured is calculated in the signal processing unit 10 by arithmetic processing of a signal derived from the received light intensities of the Stokes light, the anti-Stokes light, and the Rayleigh light.

When a received light intensity of the Stokes light from which influence of the hydrogen is removed is $I_S'(x)$, $$I_S'(x) = I_S(x) - \Delta I_S(x) \quad (15).$$

By substituting $\Delta I_S(x) = l \cdot \Delta I_R(x)$ derived from the equation (13) for the equation (15), it is established as:

$$I_S'(x) = I_S(x) - l \cdot \Delta I_R(x) \quad (16).$$

The variation of the received light intensity of the Rayleigh light due to the hydrogen molecules is calculated from:

$$\Delta I_R(x) = I_{R1}(x) - I_{R0}(x) \quad (17).$$

By substituting this value for the equation (16), it is established as:

$$I_S'(x) = I_S(x) - l \cdot (I_{R1}(x) - I_{R0}(x)) \quad (18).$$

As a result, the received light intensity of the Stokes light, from which the influence of the hydrogen is removed by using the variation of the received light intensity of the Rayleigh light, is derived (S37).

Next, when the received light intensity of the anti-Stokes light from which influence of the hydrogen is removed is $I_{AS}'(x)$, $$I_{AS}'(x) = I_{AS}(x) - \Delta I_{AS}(x) \quad (19).$$

By substituting $\Delta I_{AS}(x) = m \cdot \Delta I_R(x)$ derived from the equation (14) for the equation (19), it is established as:

$$I_{AS}'(x) = I_{AS}(x) - m \cdot \Delta I_R(x) \quad (20).$$

The variation of the light intensity of the Rayleigh light due to the hydrogen molecules is calculated from:

$$\Delta I_R(x) = I_{R1}(x) - I_{R0}(x) \quad (21).$$

By substituting this value for the equation (20), it is established as:

$$I_{AS}'(x) = I_{AS}(x) - m \cdot (I_{R1}(x) - I_{R0}(x)) \quad (22).$$

As a result, the received light intensity of the anti-Stokes light, from which the influence of the hydrogen is removed by using the variation of the received light intensity of the Rayleigh light, is derived (S38).

As described above, since the received light intensities of the compensated Stokes light and the compensated anti-Stokes light thus obtained are functions of the absolute temperature T at the scattering point 5 in the optical fiber 2 to be measured, it is possible to accurately calculate the temperature at the scattering point 5 based on the equation (5) (S39).

Effect of the Second Preferred Embodiment

According to the second preferred embodiment, it is possible to calculate the values (ratios) l, m corresponding to the variations of the received light intensities due to the hydrogen molecular absorption of the optical fiber 2 to be measured, based on the received light intensities of the Stokes light, the anti-Stokes light and the Rayleigh light that are obtained by conducting the thermometry of the optical fiber 2 to be measured in the atmosphere without hydrogen and the hydrogen atmosphere. Therefore, it is possible to compensate the received light intensity of the anti-Stokes light and the received light intensity of the Stokes light with the received light intensity of the Rayleigh light, which are obtained from the input pulse light 4 input to the optical fiber 2 to be measured in the hydrogen atmosphere in which the actual measurement is conducted. Since the Rayleigh light has a wavelength dependency that is remarkably small compared with those of the Stokes light and the anti-Stokes light, it is possible to apply the values (ratios) l, m regardless an ambient temperature of the optical fiber. Further, it is also possible to contemplate a preferred embodiment in that the thermometry may be conducted based on the Rayleigh light and the anti-Stokes light without using the Stokes light, as a simplified embodiment based on this preferred embodiment.

Third Preferred Embodiment

Figure 10:
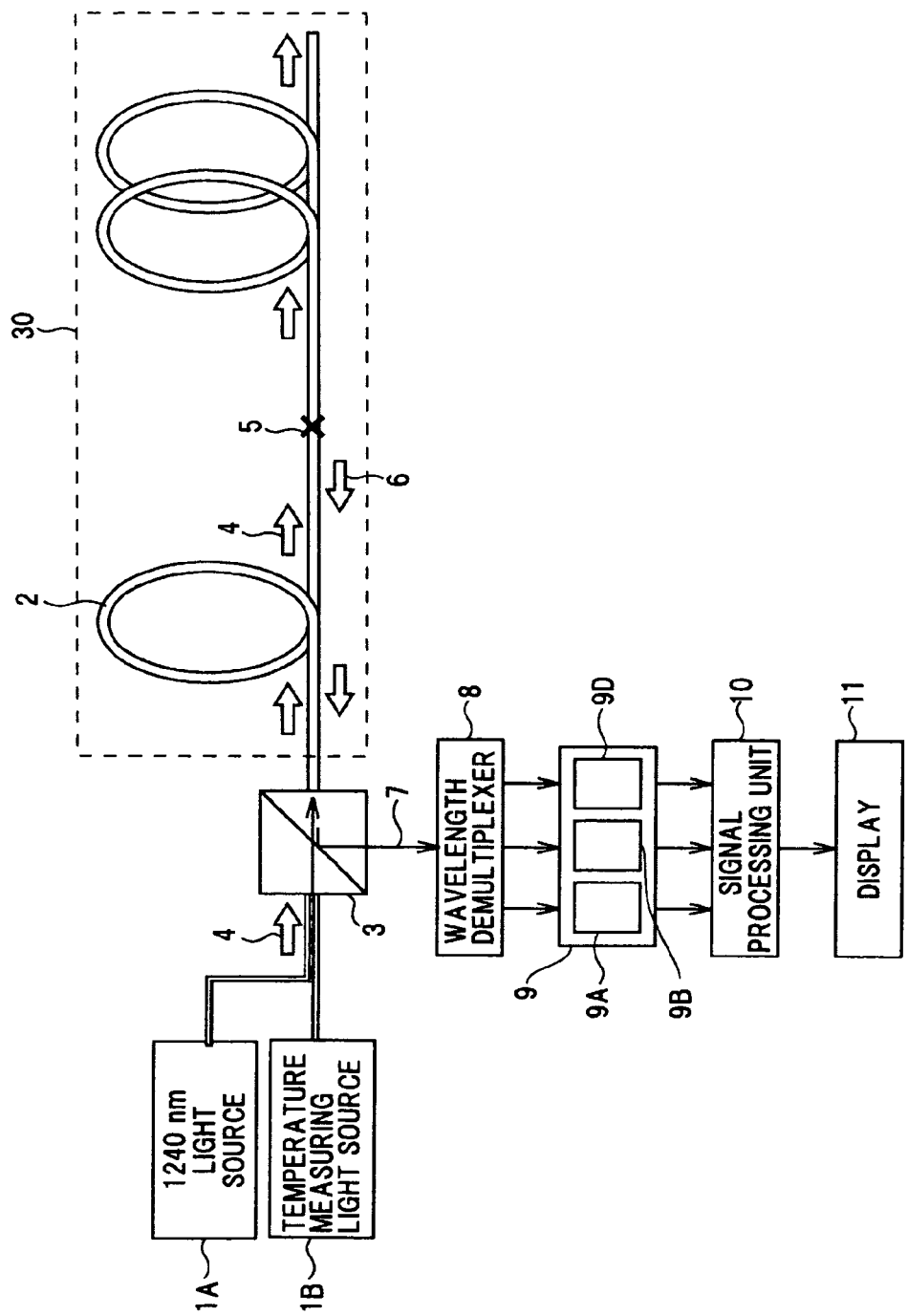
FIG. 10 is a schematic block-diagram showing an optical fiber temperature distribution measuring system in a third preferred embodiment according to the invention.
Figures 18A, 18B:
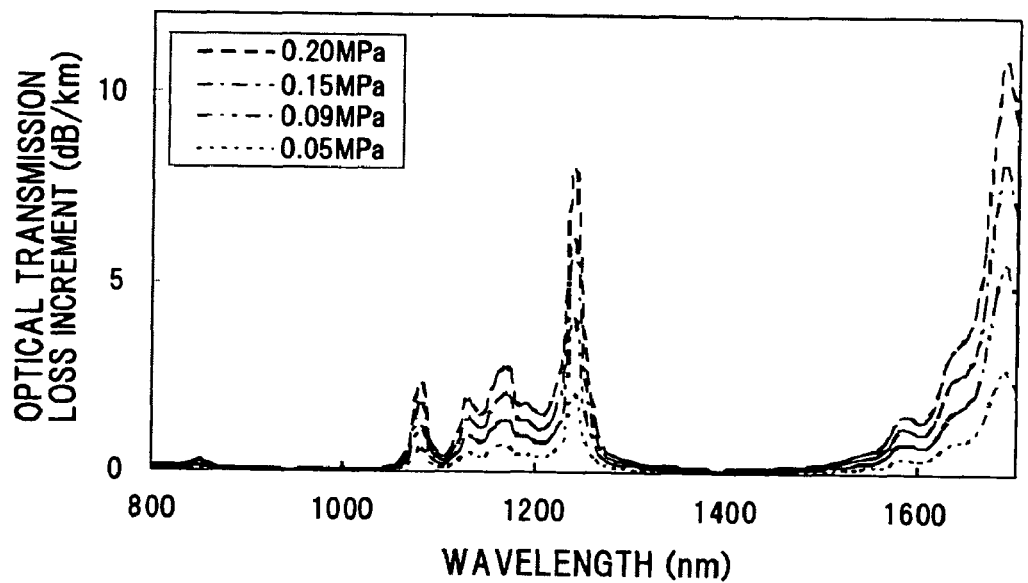
FIG. 18A is a characteristic graph showing an increment of the optical transmission loss of the optical fiber to be measured with respect to a wavelength.
FIG. 18B is a table showing increments of the optical transmission loss of the optical fiber to be measured with respect to the respective wavelengths.
Figures 19A, 19B:
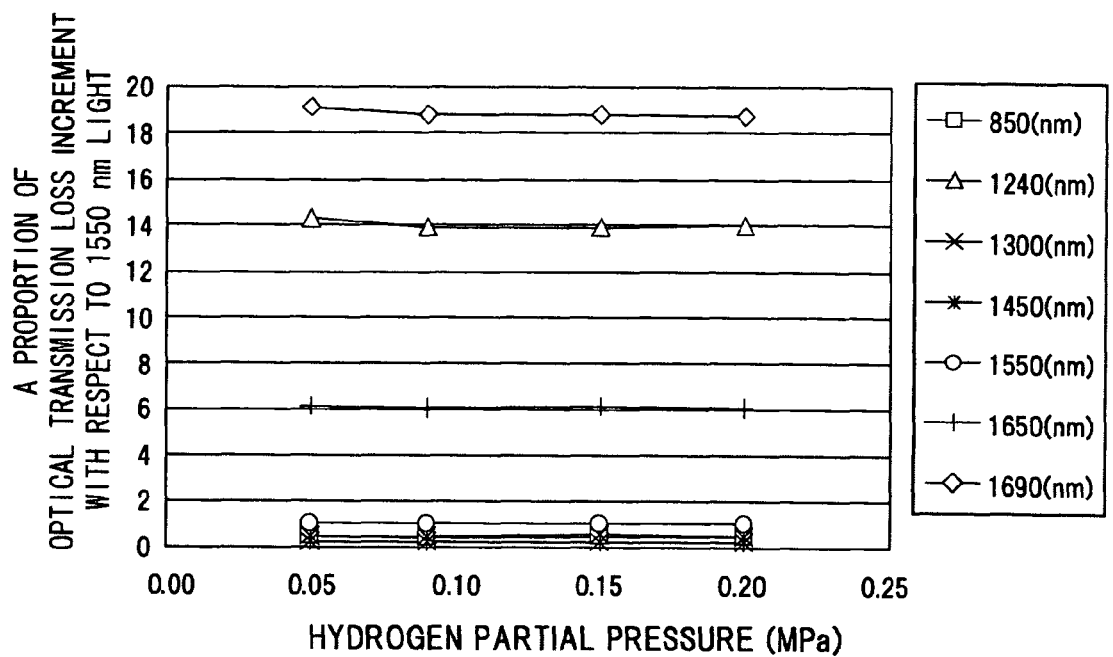
FIG. 19A is a characteristic graph showing a proportion of an increment of the optical transmission loss at other wavelengths when 1550 nm is used as a reference.
FIG. 19B is a table showing a proportion of an increment of the optical transmission loss at other wavelengths when 1550 nm is used as a reference.

FIG. 10 is a schematic block-diagram showing an optical fiber temperature distribution measuring system in a third preferred embodiment according to the invention. In the third preferred embodiment, a light with a wavelength $\lambda r$ that is different from the wavelength $\lambda$ of a temperature measuring light is used as a reference light for measuring a variation of the received light intensity. In the concrete, as shown in FIG. 18A, a light with a wavelength of 1240 nm is used as the reference light, since an increase in the optical transmission loss due to the hydrogen molecules remarkably appears at the wavelength of 1240 nm. The third preferred embodiment differs from the first preferred embodiment, in that the configuration comprises a 1240 nm light source 1A for inputting a light with a wavelength of 1240 nm to the optical fiber 2 to be measured via the beam splitter 3, a temperature measuring light source 1B, a wavelength demultiplexer 8 for separating the light output from the beam splitter 3 into the Stokes light, the anti-Stokes light, and the light with a wavelength of 1240 nm, and a signal detecting unit 9 comprising a Stokes light detecting part 9A for detecting the Stokes light separated by the wavelength demultiplexer 8, an anti-Stokes light detecting part 9B for detecting the anti-Stokes light separated by the wavelength demultiplexer 8, and a 1240 nm light detecting part 9D for detecting the light at the wavelength of 1240 nm separated by the wavelength demultiplexer 8. FIG. 10 also shows a state where the optical fiber 2 to be measured is in the hydrogen atmosphere.

Figure 11:
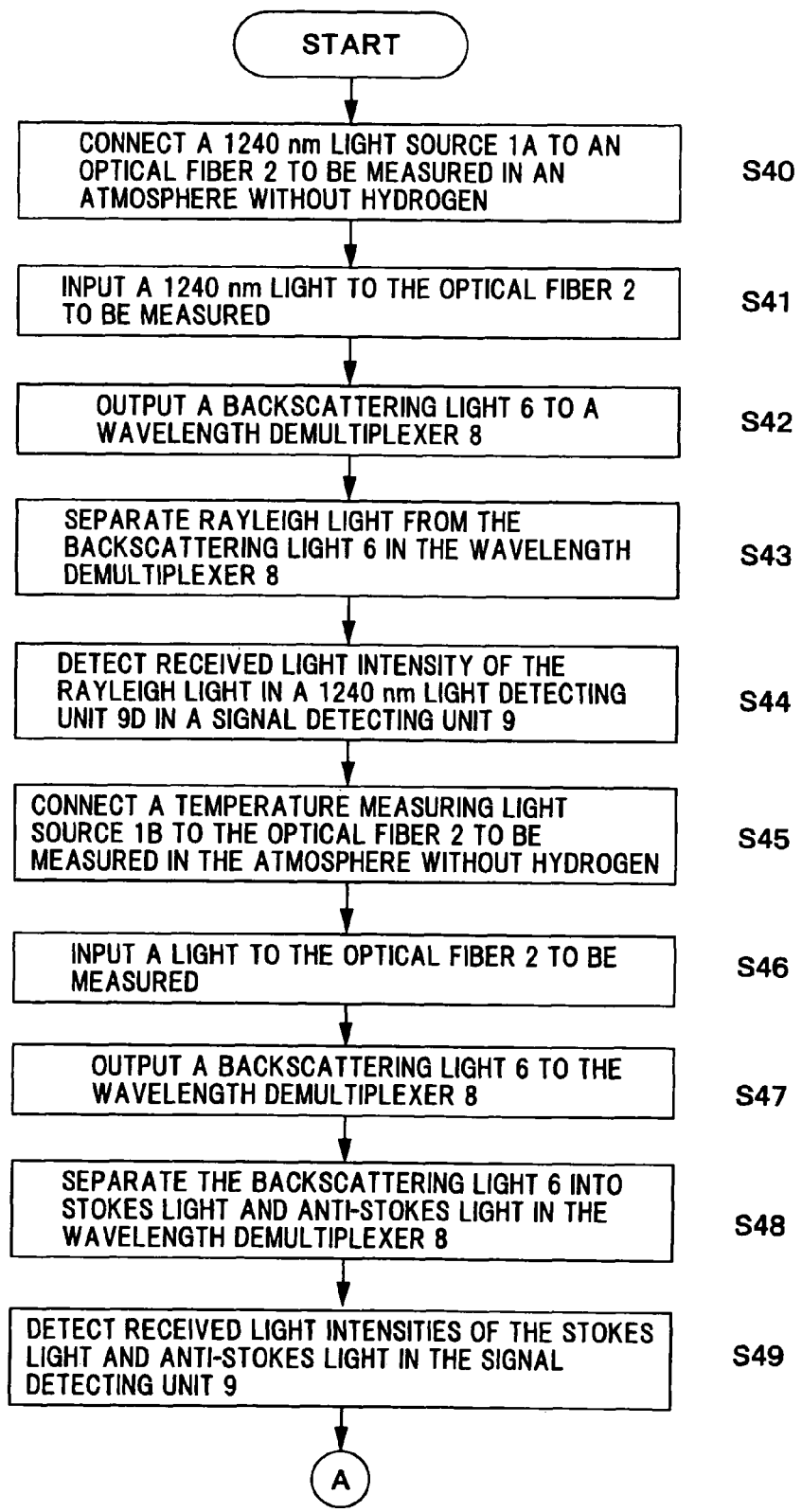
FIG. 11 is a flow chart showing a process for calculating the received light intensity $I_{S0}(x)$ of the Stokes light, the received light intensity $I_{AS0}(x)$ of the anti-Stokes light, and the received light intensity $I_{R'0}(x)$ of a Rayleigh light at 1240 nm in the third preferred embodiment according to the invention.
Figure 12:
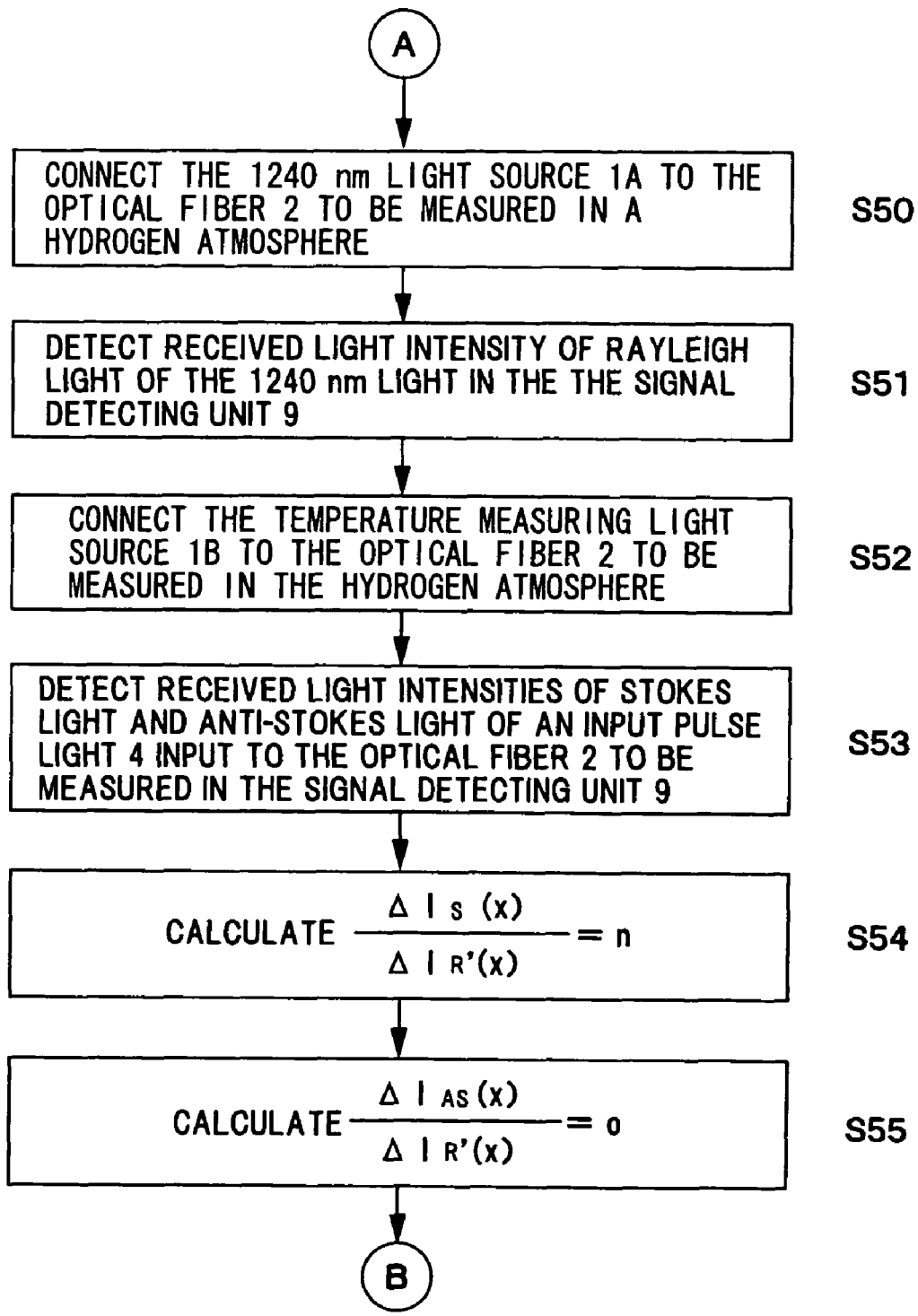
FIG. 12 is a flow chart showing a process for determining values of the constants n and o in the third preferred embodiment according to the invention.
Figure 13:
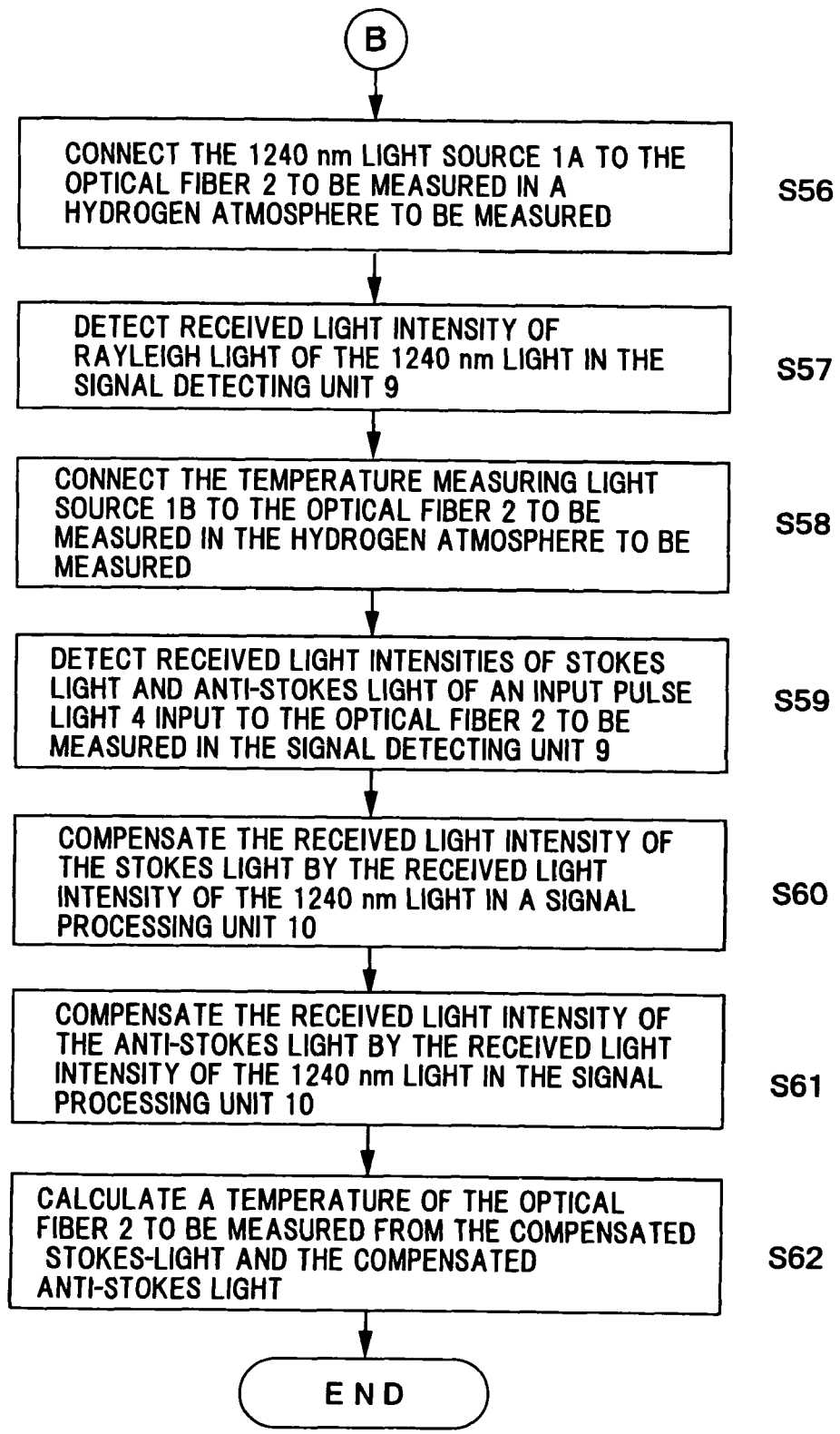
FIG. 13 is a flow chart showing a thermometric process in the optical fiber temperature distribution measuring system in the third preferred embodiment according to the invention.
Figure 14A:
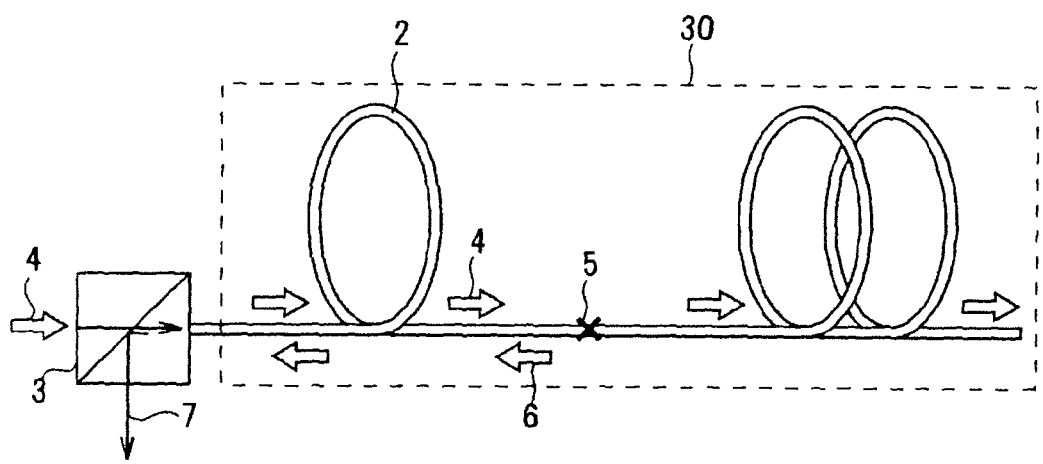
FIG. 14A is a diagram showing a principle for measuring a temperature distribution in an optical fiber by the conventional art.
Figure 14B:
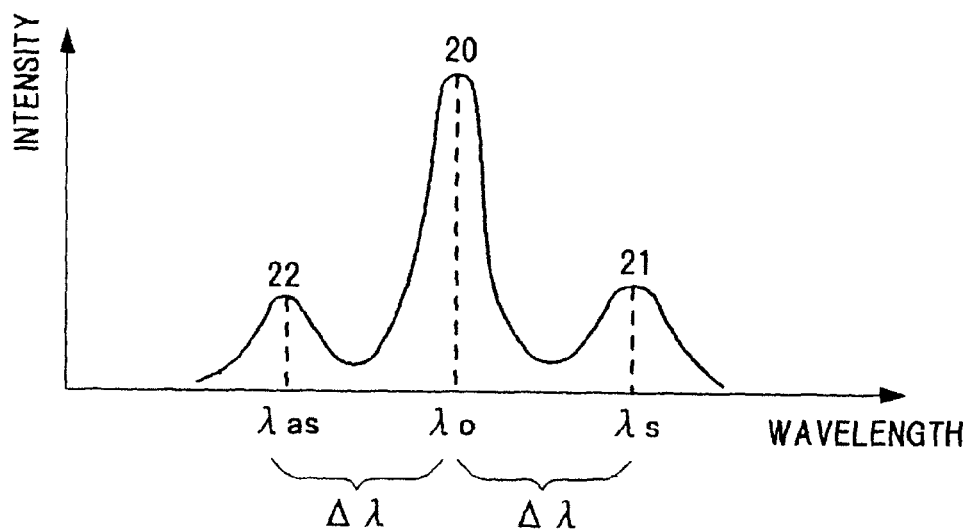
FIG. 14B is a characteristic graph showing a wavelength distribution of a backscattering light in the optical fiber by the conventional art.
Figure 15A:
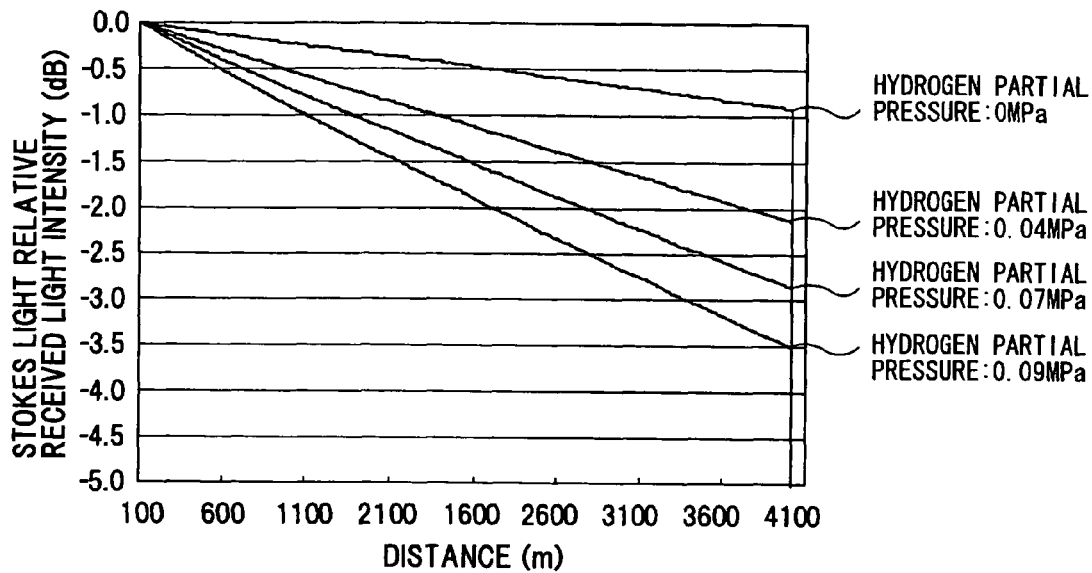
FIG. 15A is a characteristic graph showing a relationship between a distance and a received light intensity of the Stokes light when the hydrogen molecules exist.
Figure 15B:
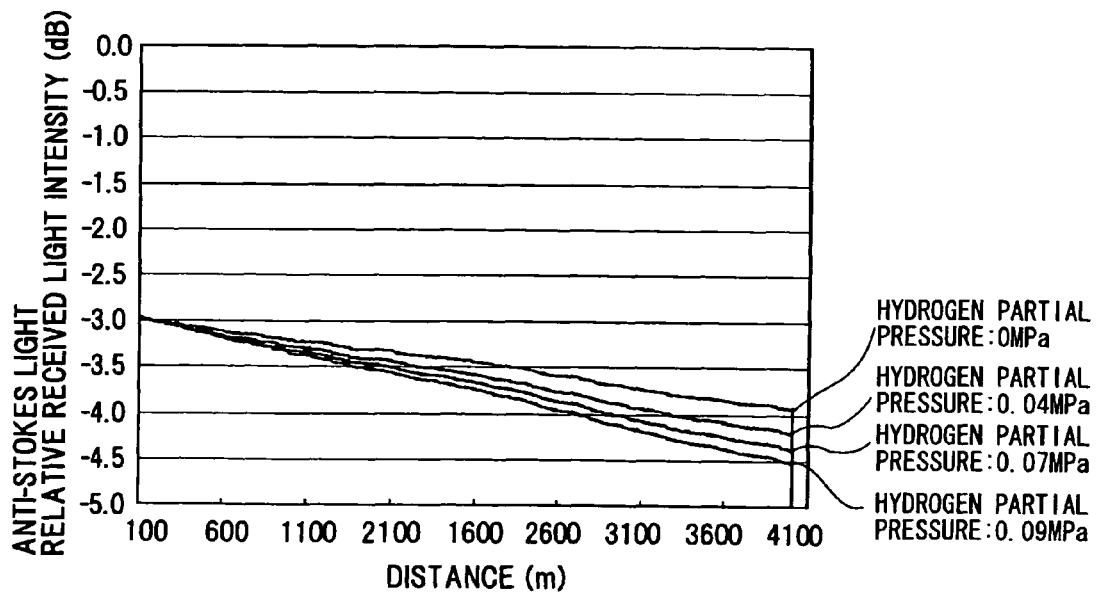
FIG. 15B is a characteristic graph showing a relationship between a distance and a received light intensity of the anti-Stokes light when the hydrogen molecules exist.
Figure 16:
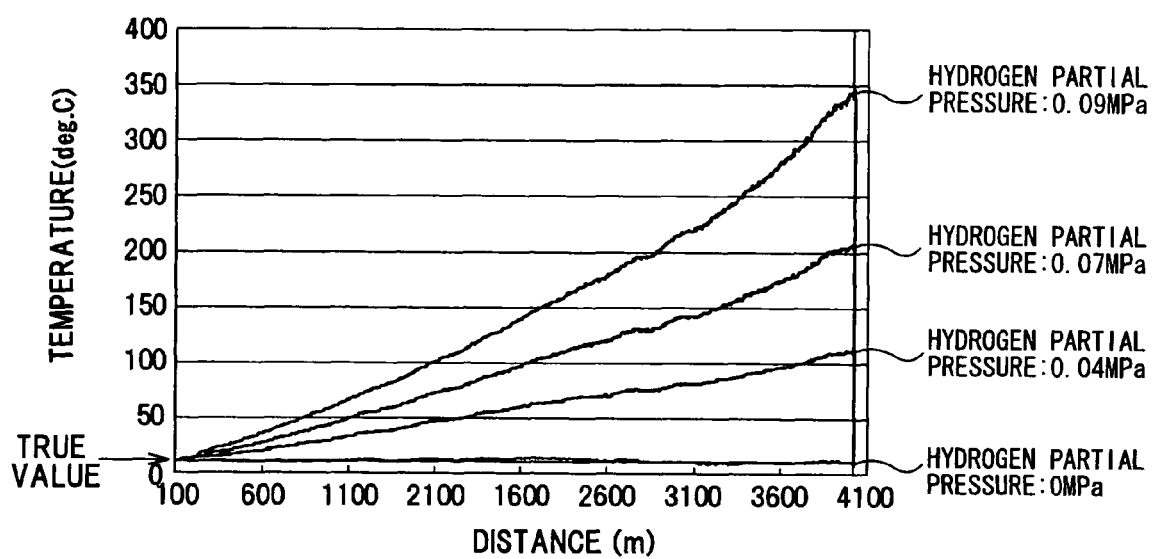
FIG. 16 is a graph showing a relationship between a thermometric value and a distance when the hydrogen molecules are diffused in the optical fiber to be measured.
Figures 17A, 17B:
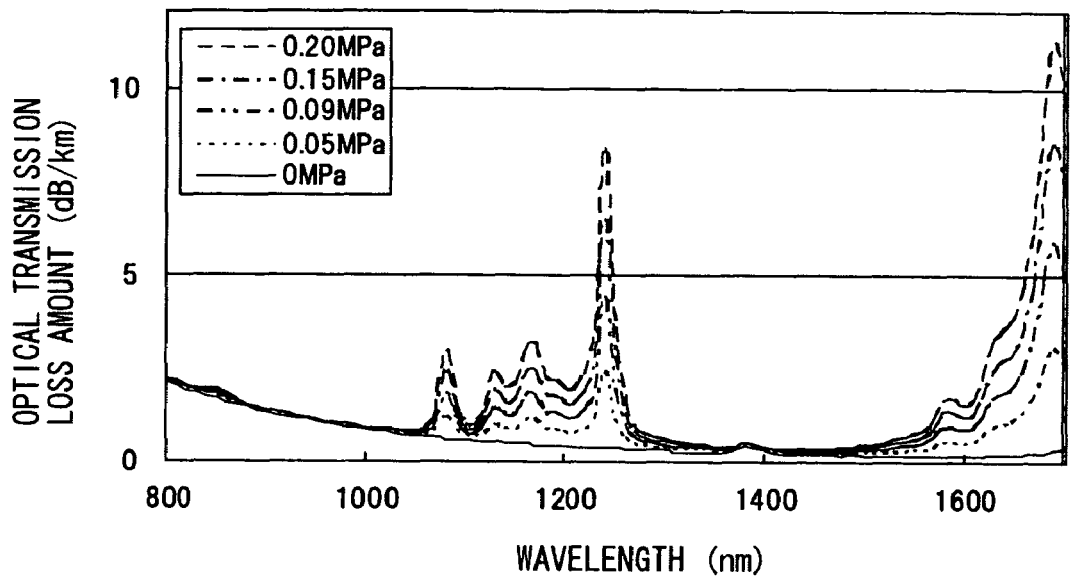
FIG. 17A is a characteristic graph showing an optical transmission loss amount of the optical fiber to be measured with respect to a wavelength.
FIG. 17B is a table showing optical transmission loss amounts of the optical fiber to be measured with respect to the respective wavelengths.

FIGS. 11 to 13 are flow charts showing thermometric processes in the optical fiber temperature distribution measuring system shown in FIG. 10. In conjunction with FIG. 11 to FIG. 13, the thermometry of the optical fiber to be measured by compensating the received light intensities of the Stokes light and the anti-Stokes light based on a Rayleigh light of the 1240 nm light will be explained below.

At first, the optical fiber 2 to be measured which is used for measurement in an atmosphere without hydrogen is connected to the 1240 nm light source 1A (S40), and an input pulse light 4 at the wavelength $\lambda r$ (=1240 nm) is input from the 1240 nm light source 1A to the optical fiber 2 to be measured (S41). In the optical fiber 2 to be measured, the backscattering light 6 ($\lambda r$, $\lambda r + \Delta \lambda r$, and $\lambda r - \Delta \lambda r$) generated at the certain scattering point 5 in a process of propagation appears and returns to an input end side. The beam splitter 3 changes an optical path of the backscattering light 6 and outputs it to the wavelength demultiplexer 8 (S42).

The wavelength demultiplexer 8 separates the Rayleigh light of the 1240 nm light included in the backscattering light 6 and outputs it to the signal detecting unit 9 (S43). The signal detecting unit 9 receives the Rayleigh light of the 1240 nm light at a 1240 nm light detecting part 9D to detect a received light intensity $I_{R'0}(x)$ of the Rayleigh light of the 1240 nm light (S44).

Next, the optical fiber 2 to be measured in an atmosphere without hydrogen is connected to a temperature measuring light source 1B (S45), and an input pulse light 4 with a wavelength $\lambda$ is input from the temperature measuring light source 1B to the optical fiber 2 to be measured (S46). The beam splitter 3 changes an optical path of the backscattering light 6 ($\lambda$, $\lambda + \Delta \lambda$, and $\lambda - \Delta \lambda$) generated by the input pulse light 4 at the scattering point 5 of the optical fiber 2 to be measured, and outputs it to the wavelength demultiplexer 8 (S47).

The wavelength demultiplexer 8 separates the Stokes light (λ+Δλ) and the anti-Stokes light (λ−Δλ) included in the backscattering light 6 and outputs them to the signal detecting unit 9 (S48). The signal detecting unit 9 receives the Stokes light at the Stokes light detecting part 9A to detect a received light intensity $I_{S0}(x)$ of the Stokes light, and receives the anti-Stokes light at the anti-Stokes light detecting part 9B to detect a received light intensity $I_{AS0}(x)$ of the anti-Stokes light (S49).

Next, the optical fiber 2 to be measured in a hydrogen atmosphere is connected to the 1240 nm light source 1A (S50). Similarly to an operation conducted in the atmosphere without hydrogen, the input pulse light 4 at the wavelength λr (=1240 nm) is input to the optical fiber 2 to be measured, the Rayleigh light is separated from the backscattering light 6 thus generated, and the signal detecting unit 9 receives the Rayleigh light of the 1240 nm light at the 1240 nm light detecting part 9D to detect a received light intensity $I_{R'1}(x)$ of the Rayleigh light of the 1240 nm light (S51).

Next, the optical fiber 2 to be measured in the hydrogen atmosphere is connected to the temperature measuring light source 1B (S52). Similarly to the operation conducted in the atmosphere without hydrogen, the input pulse light 4 at the wavelength λ is input to the optical fiber 2 to be measured, the Stokes light and the anti-Stokes light are separated from the backscattering light 6 thus generated and outputted to the signal detecting unit 9. The signal detecting unit 9 receives the Stokes light at the Stokes light detecting part 9A to detect a received light intensity $I_{S1}(x)$ of the Stokes light, and receives the anti-Stokes light at the anti-Stokes light detecting part 9B to detect a received light intensity $I_{AS1}(x)$ of the anti-Stokes light (S53).

Next, as to the optical fiber 2 to be measured, a ratio of a variation $\Delta I_S(x)$ of the received light intensity of the Stokes light to a variation $\Delta I_{R'}(x)$ of the received light intensity of the Rayleigh light of the 1240 nm light due to the hydrogen molecules, which is expressed as:

$$\Delta I_S(x)/\Delta I_{R'}(x)=n \tag{23}$$

is calculated (S54).

Next, as to the optical fiber 2 to be measured, a ratio of a variation $\Delta I_{AS}(x)$ of the received light intensity of the anti-Stokes light to a variation $\Delta I_{R'}(x)$ of the received light intensity of the Rayleigh light of the 1240 nm light due to the hydrogen molecules, which is expressed as:

$$\Delta I_{AS}(x)/\Delta I_{R'}(x)=o \tag{24}$$

is calculated (S55).

Next, the optical fiber 2 to be measured in a hydrogen atmosphere where the measurement is actually conducted is connected to the 1240 nm light source 1A (S56). The input pulse 4 with a wavelength λr (=1240 nm) is input from the 1240 nm light source 1A to the optical fiber 2 to be measured, and the Rayleigh light of the 1240 nm light is separated from the backscattering light 6 thus generated and outputted to the signal detecting unit 9. The signal detecting unit 9 receives the Rayleigh light of the 1240 nm light at the 1240 nm light detecting part 9D to detect a received light intensity $I_{R'}(x)$ of the Rayleigh light of the 1240 nm light (S57).

Next, the optical fiber 2 to be measured is connected to the temperature measuring light source 1B in the hydrogen atmosphere in which the measurement is actually conducted (S58). The input pulse 4 with a wavelength λ is input from the temperature measuring light source 1B to the optical fiber 2 to be measured, and the Stokes light and the anti-Stokes light are separated from the backscattering light 6 thus generated and outputted to the signal detecting unit 9. The signal detecting unit 9 receives the Stokes light at the Stokes light detecting part 9A to detect a received light intensity $I_S(x)$ of the Stokes light, and receives the anti-Stokes light at the anti-Stokes light detecting part 9B to detect a received light intensity $I_{AS}(x)$ of the anti-Stokes light (S59).

Next, a temperature of the optical fiber 2 to be measured is calculated in the signal processing unit 10 by arithmetic processing of a signal derived from the received light intensities of the Stokes light, the anti-Stokes light, and the Rayleigh light of the 1240 nm light.

When the received light intensity of the Stokes light of the input pulse light 4 at the wavelength λ from which influence of the hydrogen is removed is $I_S'(x)$, $$I_S'(x)=I_S(x)-\Delta I_S(x) \tag{25}$$

By substituting $\Delta I_S(x)=n \cdot \Delta I_{R'}(x)$ derived from the equation (23) for the equation (25), it is established as:

$$I_S'(x)=I_S(x)-n \cdot \Delta I_R(x) \tag{26}$$

The optical transmission loss amount of the Rayleigh light of the 1240 nm light is calculated from:

$$\Delta I_{R'}(x)=I_{R'1}(x)-I_{R'0}(x) \tag{27}$$

By substituting this value for the equation (26), it is established as:

$$I_S'(x)=I_S(x)-n \cdot (I_{R'1}(x)-I_{R'0}(x)) \tag{28}$$

As a result, the value of the Stokes light of the input pulse light 4 at the wavelength λ compensated by the Rayleigh light of the 1240 nm light is derived (S60).

Next, when a received light intensity of the anti-Stokes light of the input pulse light 4 at the wavelength λ from which influence of the hydrogen is removed is $I_{AS}'(x)$, $$I_{AS}'(x)=I_{AS}(x)-\Delta I_{AS}(x) \tag{29}$$

By substituting $\Delta I_{AS}(x)=o \cdot \Delta I_{R'}(x)$ derived from the equation (24) for the equation (29), it is established as:

$$I_{AS}'(x)=I_{AS}(x)-o \cdot \Delta I_R(x) \tag{30}$$

The optical transmission loss amount of the Rayleigh light of the 1240 nm light is established as:

$$\Delta I_{R'}(x)=I_{R'1}(x)-I_{R'0}(x) \tag{31}$$

By substituting this value for the equation (30), it is established as:

$$I_{AS}'(x)=I_{AS}(x)-o \cdot (I_{R'1}(x)-I_{R'0}(x)) \tag{32}$$

As a result, the value of the anti-Stokes light of the input pulse light 4 at the wavelength λ compensated by the Rayleigh light of the 1240 nm light is derived (S61).

As described above, since the compensated Stokes light and the compensated anti-Stokes light thus obtained are functions of the absolute temperature T at the scattering point 5 in the optical fiber 2 to be measured, it is possible to accurately calculate the temperature at the scattering point 5 based on the equation (5) (S62).

Effect of the Third Preferred Embodiment

According to the third preferred embodiment, it is possible to calculate the values (ratios) n, o corresponding to the variations of the received light intensities due to the absorption of hydrogen molecules of the optical fiber 2 to be measured, based on the received light intensities of the Stokes light and the anti-Stokes light of the input pulse light 4 at the wavelength λ and the Rayleigh light of the 1240 nm light that are obtained by conducting the thermometry of the optical fiber 2 to be measured in the atmosphere without hydrogen and the hydrogen atmosphere. Therefore, it is possible to compensate the received light intensities of the anti-Stokes light and the received light intensity of the Stokes light of the input pulse light 4 at the wavelength λ, which are obtained from the input pulse light 4 input to the optical fiber 2 to be measured in the hydrogen atmosphere in which the actual measurement is conducted, with the received light intensity of the Rayleigh light of the 1240 nm light. As shown in FIG. 18A, since an increase in the optical transmission loss due to the hydrogen molecules remarkably appears at the wavelength of 1240 nm, it is possible to compensate the received light intensity with good sensitivity.

Further, as a simplified embodiment based on this preferred embodiment, it is possible to measure the temperature based on the Rayleigh light of the 1240 nm light and the anti-Stokes light of the input pulse light 4 at the wavelength λ, without using the Stokes light of the input pulse light 4 at the wavelength λ. Still further, in this preferred embodiment, the 1240 nm light source 1A and the temperature measuring light source 1B are configured as separate light sources, however, it is also possible to provide a configuration in that a single light source unit comprising a 1240 nm light source and a temperature measuring light source is connected to the optical fiber 2 to be measured and the two light sources are switched. In addition, it is also possible to provide a configuration in that an optical signal of the 1240 nm light and an optical signal of the other wavelength for temperature measuring are sequentially input by time division to the optical fiber 2 to be measured, by tuning the wavelength of the temperature measuring light source 1B.

Fourth Preferred Embodiment

Figure 20:
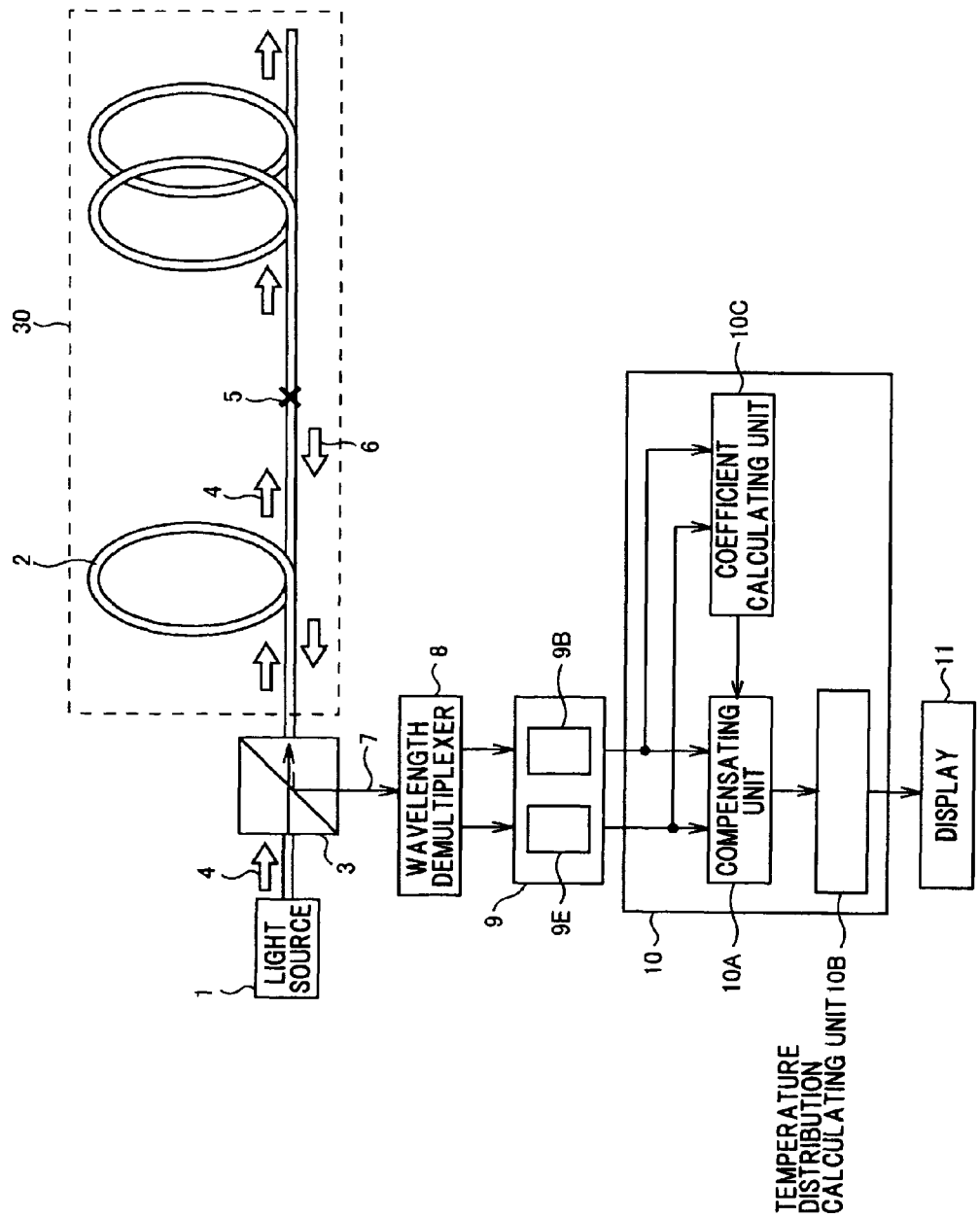
FIG. 20 is a schematic block-diagram showing an optical fiber temperature distribution measuring system in a fourth preferred embodiment according to the invention.

FIG. 20 is a schematic block-diagram showing an optical fiber temperature distribution measuring system in a fourth preferred embodiment according to the invention. The fourth preferred embodiment differs from the first preferred embodiment, in that the configuration comprises a wavelength demultiplexer 8 for separating the light output from the beam splitter 3 into a reference light and the anti-Stokes light, and a signal detecting unit 9 further comprising a reference light detecting part 9E for detecting the reference light separated by the wavelength demultiplexer 8, and a signal processing unit 10 for calculating a temperature distribution of the optical fiber 2 to be measured by using a received light intensity of the anti-Stokes light, in which the signal processing unit 10 comprises a compensating unit 10A for calculating a variation of a received light intensity of the reference light transmitted through the optical fiber 2 to be measured due to the hydrogen molecular absorption for each of measuring points, and conducting a compensation by adding a variation of the received light intensity of the anti-Stokes light due to the hydrogen molecular absorption loss calculated based on the variation of the received light intensity of the reference light to the received light intensity of the anti-Stokes light for each of the measuring points, and a temperature distribution calculating unit 10B for calculating the temperature distribution based on the received light intensity of the anti-Stokes light thus compensated. FIG. 20 also shows a state where the optical fiber 2 to be measured is in the hydrogen atmosphere.

Herein, the "compensation by adding a variation of the received light intensity of the anti-Stokes light due to the hydrogen molecular absorption loss" means the compensation based on equations expressed as:

$$I_{AS}'(x) = I_{AS}(x) - \Delta I_{AS}(x) \tag{33}$$

and $$I_{AS}'(x) = I_{AS}(x) - p \cdot \Delta I_{Rf}(x) \tag{34}$$

(p is a constant, $\Delta I_{Rf}(x) = I_{Rf1}(x) - I_{Rf0}(x)$).

Herein, $\Delta I_{Rf}(x)$ is the variation of the received light intensity of the reference light, which can be calculated from a difference between the received light intensity $I_{Rf1}(x)$ of the reference light transmitted through the optical fiber 2 to be measured in the hydrogen atmosphere and the received light intensity $I_{Rf0}(x)$ of the reference light transmitted through the optical fiber 2 to be measured in the atmosphere without hydrogen. As described above, it is possible to calculate the variation $\Delta I_{AS}(x)$ of the received light intensity of the anti-Stokes light due to the hydrogen molecular absorption loss, by multiplying the variation $\Delta I_{Rf}(x)$ of the received light intensity of the reference light due to the hydrogen molecular absorption loss by a coefficient p. In addition, common reference numerals are assigned to parts having the same configuration and the same function as those in the first preferred embodiment. Herein, the reference light means a light other than the anti-Stokes light of the input pulse light 4 input from the temperature measuring light source 1, i.e. the Stokes light, the Rayleigh light, or the light with the other wavelength (for example the light with the wavelength at 1240 nm).

Further, the signal processing unit 10 may further comprise a coefficient calculating unit 10C for calculating the coefficient p by dividing the variation $\Delta I_{AS}(x)$ of the received light intensity of the anti-Stokes light due to the hydrogen molecular absorption by the variation $\Delta I_{Rf}(x)$ of the received light intensity of the reference light due to the hydrogen molecular absorption. Further, the fourth preferred embodiment may be applied to the other respective preferred embodiments.

Fifth Preferred Embodiment

Figure 21:
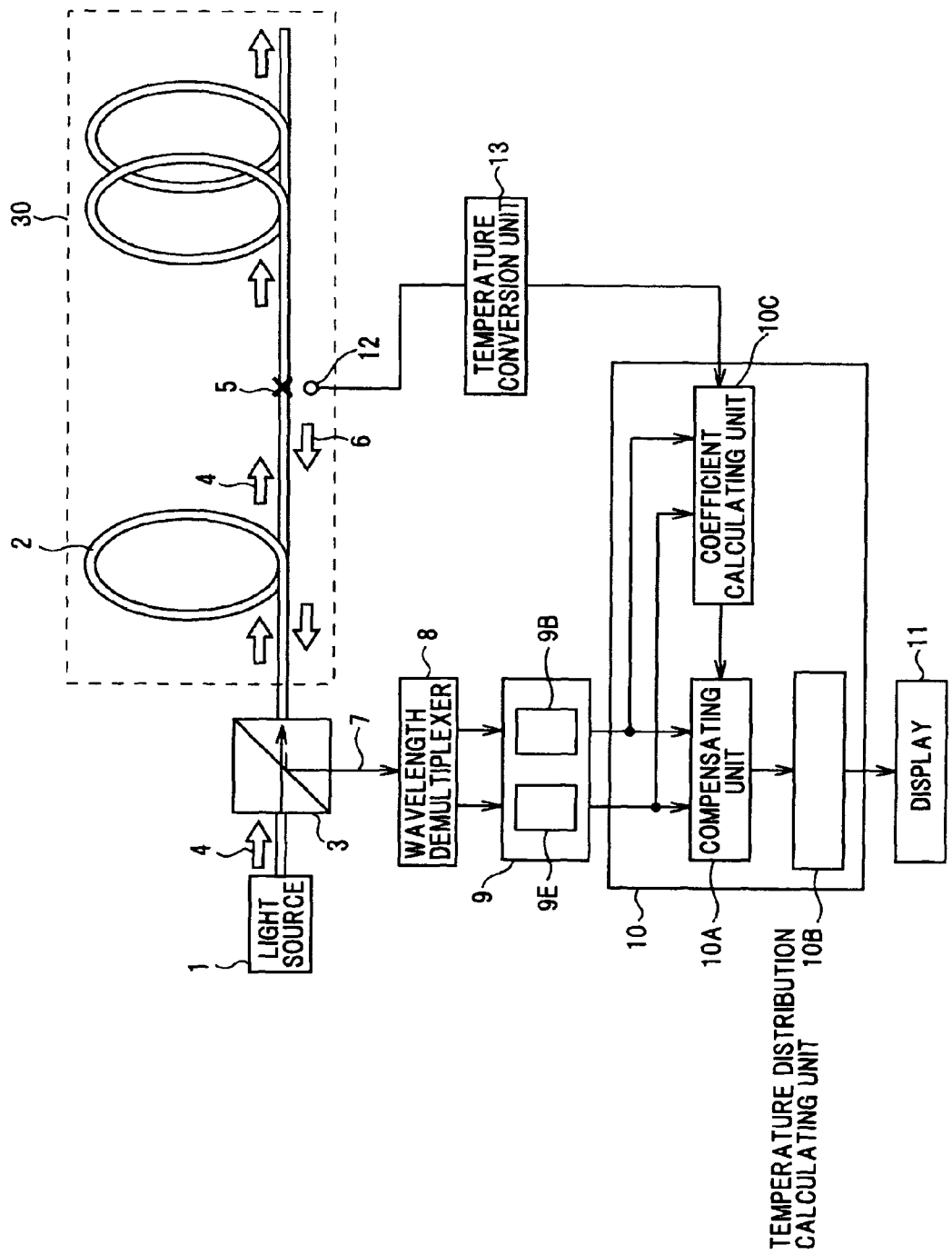
FIG. 21 is a schematic block-diagram showing an optical fiber temperature distribution measuring system in a fifth preferred embodiment according to the invention.

FIG. 21 is a schematic block-diagram showing an optical fiber temperature distribution measuring system in a fifth preferred embodiment according to the invention. The fifth preferred embodiment differs from the fourth preferred embodiment, in that the configuration further comprises one or more temperature sensor(s) 12 provided in vicinity of the optical fiber 2 to be measured in the hydrogen atmosphere for measuring a temperature of the optical fiber 2 to be measured, and a temperature conversion unit 13 for converting a signal from the temperature sensor 12 into a temperature. FIG. 21 also shows a state where the optical fiber 2 to be measured is in the hydrogen atmosphere. In addition, common reference numerals are assigned to parts having the same configuration and the same function as those in the fourth preferred embodiment.

In the fifth preferred embodiment, the compensating unit 10A calculates the variation $\Delta I_{AS}(x)$ of the received light intensity of the anti-Stokes light due to the hydrogen molecules, by multiplying the variation $\Delta I_{Rf}(x)$ of the received light intensity of the reference light due to the hydrogen molecules by the coefficient p, and compensates the received light intensity of the anti-Stokes light based on the calculation result. The temperature distribution calculating unit 10B calculates the temperature at a measuring point of the optical fiber 2 to be measured based on the received light intensity of the anti-Stokes light thus compensated. The temperature sensor 12 measures the temperature at the measuring point of the optical fiber 2 to be measured, and transmits a signal indicating the temperature to the temperature conversion unit 13 by wired communication or wireless communication. The temperature conversion unit 13 converts the signal received from the temperature sensor 12 into the temperature. The coefficient calculating unit 10C calculates the coefficient p for the compensation such that the calculation result of the temperature of the optical fiber 2 to be measured that is calculated by the temperature distribution calculating unit 10B coincides with the temperature of the optical fiber 2 to be measured that is measured by the temperature sensor 12.

In the fifth preferred embodiment, the coefficient p is calculated based on the measured temperature of the optical fiber 2 that is detected by the temperature sensor 12 installed in vicinity of the optical fiber 2 to be measured, so that it is possible to measure the temperature of the optical fiber 2 to be measured without calculating the coefficient p prior to the actual measurement on the measuring result of the variation of the received light intensities of the anti-Stokes light and the reference light in the atmosphere without hydrogen and the hydrogen atmosphere. Accordingly, even when the value of the coefficient p varies because of a variation of an output wavelength of the light source 1, it is possible to accurately compensate the received light intensity of the anti-Stokes light without being affected by the variation of the coefficient value. Further, by providing a plurality of the temperature sensors 12, it is possible to conduct the compensation with high accuracy, even when a temperature difference between the measuring points of the optical fiber 2 to be measured is large. Still further, the fifth preferred embodiment may be applied to the other preferred embodiments.

Sixth Preferred Embodiment

Figure 22:
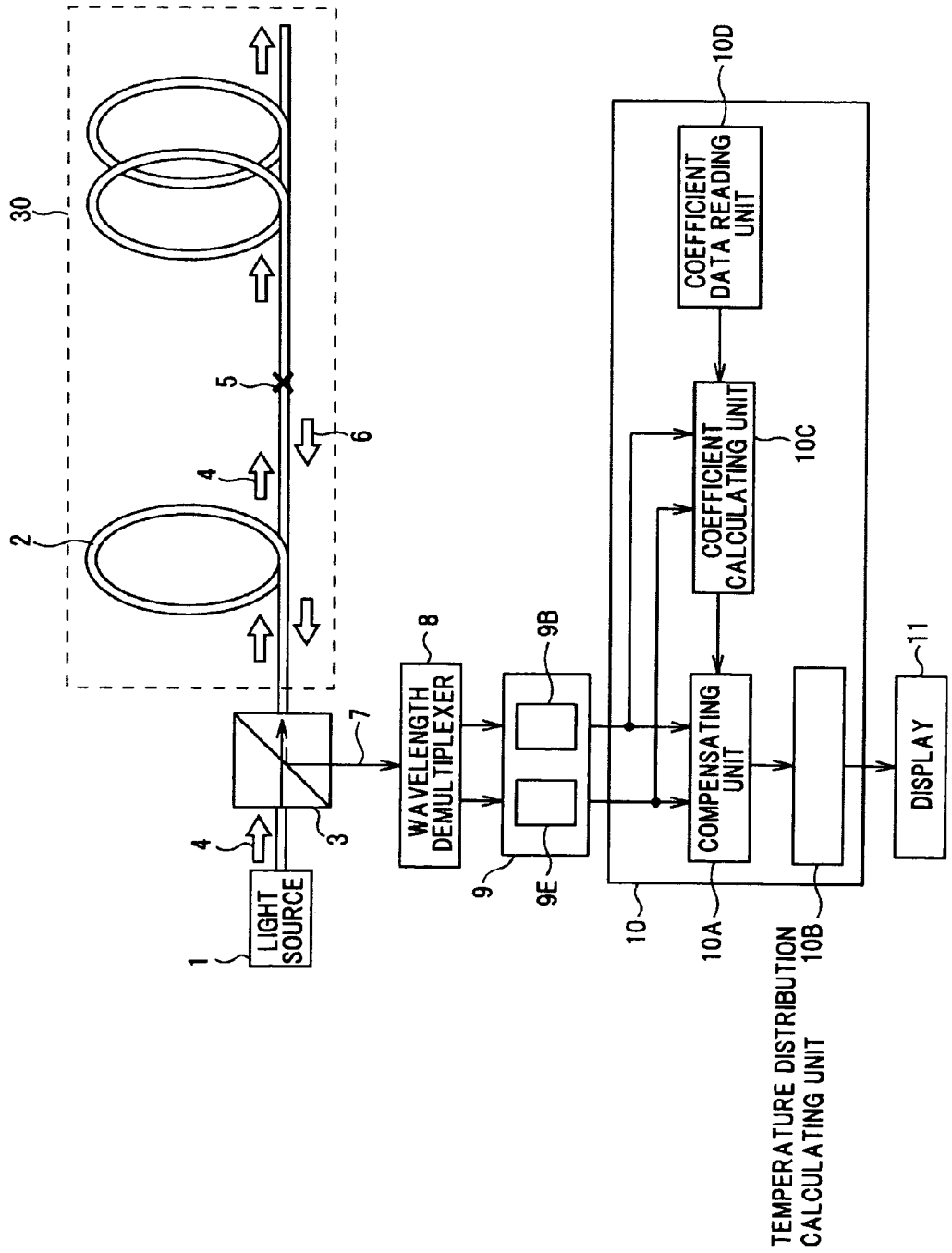
FIG. 22 is a schematic block-diagram showing an optical fiber temperature distribution measuring system in a sixth preferred embodiment according to the invention.

FIG. 22 is a schematic block-diagram showing an optical fiber temperature distribution measuring system in a sixth preferred embodiment according to the invention. The sixth preferred embodiment differs from the fourth preferred embodiment, in that the configuration further comprises a coefficient data reading unit 10D, to which a coefficient p for the compensation is input from the outside of the measuring system, when the signal processing unit 10 adds the variation of the received light intensity of the anti-Stokes light due to the hydrogen molecules, which is calculated based on the variation of the received light intensity of the reference light due to the hydrogen molecules, to the received light intensity of the anti-Stokes light for each of the measuring points. FIG. 22 also shows a state where the optical fiber 2 to be measured is in the hydrogen atmosphere. In addition, common reference numerals are assigned to parts having the same configuration and the same function as those in the fourth preferred embodiment. Still further, the sixth preferred embodiment may be applied to the other preferred embodiments.

Seventh Preferred Embodiment

FIG. 23 is a schematic block-diagram showing an optical fiber temperature distribution measuring system in a seventh preferred embodiment according to the invention. The Stokes-light has temperature dependency although the dependency is lower than that of the anti-Stokes light. Accordingly, concerning the equation (11), in the case that the ambient temperature of the optical fiber 2 to be measured when detecting the received light intensity $I_{S0}(x)$ of the Stokes light in the atmosphere without hydrogen and the received light intensity $I_{S1}(x)$ of the Stokes light in the hydrogen atmosphere are different, an error is caused in the variation of the received light intensity of the Stokes light calculated by the equation (11) by a difference in the received light intensity of the Stokes light due to the difference in the ambient temperature. However, it is possible to solve the issue of the error, by subtracting the difference in the received light intensity due to the difference in the ambient temperature from the variation of the received light intensity of the Stokes light calculated from the equation (11).

The seventh preferred embodiment differs from the fourth preferred embodiment, in that the signal processing unit 10 further comprises a reference light compensating unit 10E for determining the variation of the received light intensity of the reference light due to the difference in the ambient temperature of the optical fiber 2 to be measured, and adding the variation of the received light intensity of the reference light due to the difference in the ambient temperature to the received light intensity of the reference light for each of the measuring points of the optical fiber 2 to be measured. FIG. 23 also shows a state where the optical fiber 2 to be measured is in the hydrogen atmosphere. In addition, common reference numerals are assigned to parts having the same configuration and the same function as those in the fourth preferred embodiment.

In the seventh preferred embodiment, the variation of the received light intensity of the reference light due to the difference in the ambient temperature of the optical fiber 2 to be measured can be calculated as follows. Firstly, a first measurement of a temperature distribution is conducted at a stage in that the hydrogen molecules are not diffused in the optical fiber 2 to be measured and the influence of the hydrogen molecular absorption is small. Next, in a second measurement of the temperature distribution, the variation of the received light intensity of the reference light due to the difference in the ambient temperature is determined based on the result obtained from the first measurement of the temperature distribution. Further, in following measurements, the variation of the received light intensity of the reference light due to the difference in the ambient temperature is determined based on the result obtained from the previous measurement of the temperature distribution, and similar step may be repeated.

In addition, as a result of the latest measurement of the temperature distribution, if it is found that the ambient temperature of the optical fiber 2 to be measured differs from an ambient temperature set by the signal processing unit 10, the ambient temperature for measuring the received light intensity of the reference light is reset based on the latest measured temperature. Further, the variation of the received light intensity of the reference light due to the difference in the ambient temperature is compensated based on a previously measured data about a relationship between the ambient temperature and the variation of the received light intensity of the reference light due to the difference in the ambient temperature. The measurement of the temperature distribution of the optical fiber 2 to be measured is conducted again based on the received light intensity of the reference light thus compensated.

In the atmosphere that is less affected by the hydrogen molecular absorption, it is possible to measure the temperature according to the conventional art, so that the measured temperature can be used as an initial temperature for compensating the variation of the received light intensity of the reference light due to the difference in the ambient temperature. The reference light compensating unit 10E may be applied to the fifth and sixth preferred embodiments.

A light source wavelength of the temperature measuring light source used in the first to seventh preferred embodiments may be 850 nm band, 1060 nm band, 1300 nm band, 1550 nm band and the like, however, the present invention is not limited to these wavelengths.

As the optical fiber 2 to be measured that is used in the first to seventh preferred embodiments, various optical fibers may be used. In particular, it is preferable to use a pure silica core fiber.

In the hydrogen atmosphere, in addition to the increase in the optical transmission loss due to the diffusion of the hydrogen molecules, there is a problem of the absorption loss such as the OH absorption loss due to the formation of the hydroxyl group as a result of a chemical reaction between hydrogen molecules and glass defects in an optical fiber, as disclosed by a reference document (N. Uchida and N. Uesugi, "Infrared Optical Loss Increase in Silica Fibers due to Hydrogen", J. Lightwave Technol., Vol LT-4, No. 8, pp. 1132-1138, August 1986.). The compensation of the received light intensity in the present invention is not effective for an error caused by the absorption loss. On the other hand, it is known that the increase of the absorption loss hardly occurs in the pure silica core fiber. This is disclosed, for example, by another reference document (H. Kanamori et al "Transmission Characteristics and Reliability of Pure-Silica-Core Single-Mode Fibers", J. Lightwave Technol., Vol LT-4, No. 8, pp. 1144-1150, August 1986.). Therefore, since it is possible to prevent the absorption loss resulted from the chemical reaction between the hydrogen molecule and the optical fiber by using the pure silica core fiber which does not chemically react with the hydrogen, it is effective to use the pure silica core fiber as a fiber for the temperature distribution measuring system according to the present invention in which the influence of the hydrogen molecular absorption is corrected.

Accordingly, when the pure silica core fiber is used in the temperature distribution measuring system in the present invention, there is an effect of further reducing the error, compared with the case of using the other optical fibers.

INDUSTRIAL APPLICABILITY

According to the optical fiber temperature distribution measuring apparatus, the method for measuring optical fiber temperature distribution, and the optical fiber temperature distribution system of the present invention, it is possible to compensate the optical transmission loss of the Stokes light and the anti-Stokes light due to the hydrogen molecules in the hydrogen atmosphere, so that it is possible to conduct an accurate temperature measuring even in the hydrogen atmosphere.

What is claimed is:

1. An optical fiber temperature distribution measuring apparatus, comprising:
    a light source for inputting a pulse light to an optical fiber to be measured;
    a signal detecting unit for detecting a received light intensity of a predetermined light included in a backscattering light generated by an input of the pulse light in the optical fiber in a hydrogen atmosphere and in an atmosphere without hydrogen, the predetermined light comprising any of a combination of a Stokes light and an anti-Stokes light, a combination of the Stokes light, the anti-Stokes light, and a Rayleigh light, and a combination of the Rayleigh light and the anti-Stokes light; and
    a signal processing unit for calculating a value corresponding to a variation of a received light intensity due to a hydrogen molecular absorption in the optical fiber based on the received light intensity of the predetermined light, calculating a ratio of a value corresponding to a variation of a received light intensity of the anti-Stokes light with respect to the value corresponding to the variation of a received light intensity of a light other than the anti-Stokes light in the predetermined light, to provide a predetermined coefficient, and calculating a variation of the received light intensity due to the hydrogen molecular absorption of the anti-Stokes light by the predetermined coefficient, when a temperature of the optical fiber is measured, thereby calibrating the received light intensity of the anti-Stokes light to remove an influence of the hydrogen molecular absorption from the received light intensity of the anti-Stokes light.

2. The optical fiber temperature distribution measuring apparatus according to claim 1, wherein the signal processing unit compensates the received light intensity of the anti-Stokes light corresponding to the temperature of the optical fiber based on a value corresponding to a variation of a received light intensity of the Stokes light.

3. An optical fiber temperature distribution measuring system using the optical fiber temperature distribution measuring apparatus according to claim 1, wherein the optical fiber to be measured comprises a pure silica core optical fiber.

4. An optical fiber temperature distribution measuring apparatus comprising:
    a light source for inputting a pulse light to an optical fiber to be measured;
    a signal detecting unit for detecting a received light intensity of a predetermined light included in a backscattering light generated by an input of the pulse light in the optical fiber to be measured; and
    a signal processing unit for calculating a value corresponding to a variation of a received light intensity due to a hydrogen molecular absorption in the optical fiber to be measured based on the received light intensity of the predetermined light, to compensate the received light intensity of the predetermined light corresponding to a temperature of the optical fiber to be measured based on the value,
    wherein the signal processing unit compensates the received light intensity of the predetermined light corresponding to the temperature of the optical fiber to be measured based on a value corresponding to the variation of the received light intensity obtained from a light at a wavelength of the pulse light for temperature measuring output from the light source.

5. A method for measuring optical fiber temperature distribution, comprising:
    inputting a pulse light from a light source to an optical fiber to be measured;
    detecting a received light intensity of a predetermined light included in a backscattering light generated by the input of the pulse light in the optical fiber in a hydrogen atmosphere and in an atmosphere without hydrogen, the predetermined light comprising any of a combination of a Stokes light and an anti-Stokes light, a combination of the Stokes light, the anti-Stokes light, and a Rayleigh light, and a combination of the Rayleigh light and the anti-Stokes light;
    calculating a value corresponding to a variation of a received light intensity due to a hydrogen molecular absorption of the optical fiber based on the received light intensity of the predetermined light;
    calculating a ratio of a value corresponding to a variation of a received light intensity of the anti-Stokes light with respect to the value corresponding to the variation of a received light intensity of a light other than the anti-Stokes light in the predetermined light, to provide a predetermined coefficient; and
    calculating a variation of the received light intensity due to the hydrogen molecular absorption of the anti-Stokes light, by multiplying a variation of the received light intensity of the light other than the anti-Stokes light by the predetermined coefficient, when a temperature of the optical fiber is measured, thereby calibrating the received light intensity of the anti-Stokes light to remove an influence of the hydrogen molecular absorption from the received light intensity of the anti-Stokes light.

6. A method for measuring optical fiber temperature distribution, comprising:

inputting a pulse light from a light source to an optical fiber to be measured;

detecting a received light intensity of a predetermined light included in a backscattering light generated by the input of the pulse light in the optical fiber to be measured;

calculating a value corresponding to a variation of a received light intensity due to a hydrogen molecular absorption of the optical fiber to be measured based on the received light intensity of the predetermined light; and compensating the received light intensity of the predetermined light corresponding to the temperature of the optical fiber to be measured based on the value, wherein a received light intensity of an anti-Stokes light corresponding to the temperature of the optical fiber to be measured is compensated based on a Stokes light included in the backscattering light as the predetermined light.

7. A method for measuring optical fiber temperature distribution, comprising:

inputting a pulse light from a light source to an optical fiber to be measured;

detecting a received light intensity of a predetermined light included in a backscattering light generated by the input of the pulse light in the optical fiber to be measured;

calculating a value corresponding to a variation of a received light intensity due to a hydrogen molecular absorption of the optical fiber to be measured based on the received light intensity of the predetermined light; and compensating the received light intensity of the predetermined light corresponding to the temperature of the optical fiber to be measured based on the value, wherein received light intensities of a Stokes light and an anti-Stokes light corresponding to the temperature of the optical fiber to be measured are compensated based on a Rayleigh light included in the backscattering light as the predetermined light.

8. An optical fiber temperature distribution measuring apparatus, comprising:

a light source for inputting a pulse light to an optical fiber to be measured;

a signal detecting unit for detecting received light intensities of a plurality of predetermined lights included in a backscattering light generated by an input of the pulse light in the optical fiber to be measured, the predetermined lights including an anti-Stokes light and a reference light; and a signal processing unit for calculating a temperature distribution of the optical fiber to be measured based on the received light intensity of the anti-Stokes light, the signal processing unit including:

a compensating unit for calculating a variation of the received light intensity of the reference light due to a hydrogen molecular absorption for each of measuring points, and conducting a compensation by adding a variation of the received light intensity of the anti-Stokes light due to the hydrogen molecular absorption calculated based on the variation of the received light intensity of the reference light to the received light intensity of the anti-Stokes light for each of the measuring points; and a temperature distribution calculating unit for calculating the temperature distribution based on the compensated received light intensity of the anti-Stokes light.

9. An optical fiber temperature distribution measuring system using the optical fiber temperature distribution measuring apparatus according to claim 8, wherein the optical fiber to be measured comprises a pure silica core optical fiber.

10. The optical fiber temperature distribution measuring apparatus according to claim 8, wherein the variation of the received light intensity of the anti-Stokes light due to the hydrogen molecular absorption is calculated by multiplying the variation of the received light intensity of the reference light due to the hydrogen molecular absorption by a predetermined coefficient.

11. The optical fiber temperature distribution measuring apparatus according to claim 10, further comprising:

a coefficient calculating unit for calculating a value by dividing the variation of the received light intensity of the anti-Stokes light due to the hydrogen molecular absorption by the variation of the received light intensity of the reference light due to the hydrogen molecular absorption as the predetermined coefficient.

12. The optical fiber temperature distribution measuring apparatus according to claim 10, further comprising:

a coefficient calculating unit for calculating the predetermined coefficient as a value for compensating the received light intensity of the anti-Stokes light based on a temperature measured by a temperature sensor installed in vicinity of the optical fiber to be measured, to coincide with the measured temperature.

13. The optical fiber temperature distribution measuring apparatus according to claim 10, further comprising:

a coefficient data reading unit to which the predetermined coefficient is input from the outside.

14. The optical fiber temperature distribution measuring apparatus according to claim 10, further comprising:

a reference light compensating unit for determining the variation of the received light intensity of the reference light due to a temperature difference, and adding the variation of the received light intensity of the reference light due to the temperature difference to the received light intensity of the reference light for each of the measuring points of the optical fiber to be measured.

15. The optical fiber temperature distribution measuring apparatus according to claim 14, wherein the variation of the received light intensity of the reference light due to the temperature difference is determined based on a temperature distribution measuring result in a previous measurement.

16. The optical fiber temperature distribution measuring apparatus according to claim 14, wherein the variation of the received light intensity of the reference light due to the temperature difference is determined based on a temperature distribution measuring result in a latest measurement.

17. A method for measuring optical fiber temperature distribution, said method comprising:

inputting a pulse light from a light source to an optical fiber to be measured;

detecting received light intensities of a plurality of predetermined lights included in a backscattering light generated by the input of the pulse light in the optical fiber to be measured, the predetermined lights including an anti-Stokes light and a reference light;

calculating a temperature distribution of the optical fiber to be measured based on the received light intensity of the anti-Stokes light;

calculating a variation of the received light intensity of the reference light due to a hydrogen molecular absorption for each of measuring points;

conducting compensation by adding a variation of the received light intensity of the anti-Stokes light due to the hydrogen molecular absorption calculated based on the variation of the received light intensity of the reference light to the received light intensity of the anti-Stokes light for each of the measuring points; and calculating the temperature distribution based on the compensated received light intensity of the anti-Stokes light.

18. The method for measuring optical fiber temperature distribution according to claim 17, further comprising:

conducting a first measurement of the temperature distribution at a stage in that the hydrogen molecules are not diffused in the optical fiber to be measured and an influence of the hydrogen molecular absorption is small;

conducting a second measurement of the temperature distribution to determine the variation of the received light intensity of the reference light due to the temperature difference based on the result of the first measurement of the temperature distribution; and adding the variation of the received light intensity of the reference light due to the temperature difference to the received light intensity of the reference light for each of the measuring points of the optical fiber to be measured.

19. The method for measuring optical fiber temperature distribution according to claim 17, wherein the variation of the received light intensity of the anti-Stokes light due to the hydrogen molecular absorption is calculated by multiplying the variation of the received light intensity of the reference light due to the hydrogen molecular absorption by a predetermined coefficient.

20. The method for measuring optical fiber temperature distribution according to claim 19, wherein the predetermined coefficient is a value obtained by dividing the variation of the received light intensity of the anti-Stokes light due to the hydrogen molecular absorption by the variation of the received light intensity of the reference light due to the hydrogen molecular absorption.

21. The method for measuring optical fiber temperature distribution according to claim 19, wherein the predetermined coefficient is a value for compensating the received light intensity of the anti-Stokes light based on a temperature measured by a temperature sensor installed in vicinity of the optical fiber to be measured, to coincide with the measured temperature.

22. The method for measuring optical fiber temperature distribution according to claim 19, wherein the predetermined coefficient is input from the outside.

23. An optical fiber temperature distribution measuring apparatus, comprising:

a light source for inputting a pulse light to an optical fiber to be measured;

a signal detecting unit for detecting received light intensities of a plurality of predetermined lights included in a backscattering light generated by an input of the pulse light in the optical fiber in a hydrogen atmosphere and in an atmosphere without hydrogen, the predetermined lights including an anti-Stokes light and a reference light; and a signal processing unit for calculating a temperature distribution of the optical fiber based on the received light intensity of the anti-Stokes light, wherein the signal processing unit comprises:

a calibrating unit for calculating a variation of the received light intensity of the reference light due to a hydrogen molecular absorption for each of measuring points, calculating a value corresponding to variation of the received light intensity for each of the reference light and the anti-Stokes light due to the hydrogen molecular absorption in the optical fiber, calculating a ratio of a value corresponding to a variation of a received light intensity of the anti-Stokes light with respect to the value corresponding to the variation of a received light intensity of the reference light, to provide a predetermined coefficient, calculating a predetermined value by multiplying a variation of the received light intensity of the reference light due to the hydrogen molecular absorption by the predetermined coefficient, and calibrating the variation of the received light intensity of the anti-Stokes light due the hydrogen molecular absorption by adding the predetermined value to the received light intensity of the anti-Stokes light for each of the measuring points; and a temperature distribution calculating unit for calculating the temperature distribution based on the calibrated received light intensity of the anti-Stokes light.

24. A method for measuring optical fiber temperature distribution, said method comprising:

inputting a pulse light from a light source to an optical fiber to be measured;

detecting received light intensities of a plurality of predetermined lights included in a backscattering light generated by the input of the pulse light in the optical fiber, the predetermined lights including an anti-Stokes light and a reference light;

calculating a variation of the received light intensity of the reference light due to a hydrogen molecular absorption for each of measuring points;

calculating a value corresponding to a variation of the received light intensity for each of the reference light and the anti-Stokes light due to the hydrogen molecular absorption in the optical fiber;

calculating a ratio of a value corresponding to a variation of a received light intensity of the anti-Stokes light with respect to the value corresponding to the variation of a received light intensity of the reference light, to provide a predetermined coefficient;

calculating a predetermined value by multiplying a variation of the received light intensity of the reference light due to the hydrogen molecular absorption by the predetermined coefficient;

calibrating the variation of the received light intensity of the anti-Stokes light due the hydrogen molecular absorption by adding the predetermined value to the received light intensity of the anti-Stokes light for each of the measuring points; and calculating a temperature distribution of the optical fiber based on the calibrated received light intensity of the anti-Stokes light.

* * * * *